(12) United States Patent
Cao et al.

(10) Patent No.: US 9,316,542 B2
(45) Date of Patent: Apr. 19, 2016

(54) THERMAL SENSOR SYSTEM AND METHOD BASED ON CURRENT RATIO

(71) Applicant: Freescale Semiconductor, Inc., Austin, TX (US)

(72) Inventors: Lipeng Cao, Austin, TX (US); Tommi M. Jokinen, Austin, TX (US); Khoi Mai, Austin, TX (US); Hector Sanchez, Cedar Park, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 108 days.

(21) Appl. No.: 13/628,939

(22) Filed: Sep. 27, 2012

(65) Prior Publication Data

US 2014/0086279 A1    Mar. 27, 2014

(51) Int. Cl.
*G01K 7/01* (2006.01)
*G01K 1/02* (2006.01)

(52) U.S. Cl.
CPC . *G01K 1/026* (2013.01); *G01K 7/01* (2013.01)

(58) Field of Classification Search
USPC .................................. 374/178, 170; 327/513
See application file for complete search history.

(56) References Cited

U.S. PATENT DOCUMENTS

| | | | |
|---|---|---|---|
| 5,317,287 A | 5/1994 | Brown | |
| 5,546,041 A | 8/1996 | Szajda | |
| 5,899,570 A | 5/1999 | Darmawaskita et al. | |
| 5,977,813 A | 11/1999 | Boerstler | |
| 6,011,422 A | 1/2000 | Koglin et al. | |
| 6,078,208 A | 6/2000 | Nolan et al. | |
| 6,097,239 A | 8/2000 | Miranda et al. | |
| 6,160,305 A | 12/2000 | Sanchez | |
| 6,612,502 B2 | 9/2003 | Poucher | |
| 6,869,216 B1 | 3/2005 | Holloway et al. | |
| 7,078,955 B2 | 7/2006 | Kim et al. | |
| 7,140,767 B2 | 11/2006 | McLeod et al. | |
| 7,202,696 B1 | 4/2007 | Taheri | |
| 7,331,708 B2 | 2/2008 | Blom et al. | |
| 7,429,129 B2 | 9/2008 | St. Pierre et al. | |
| 7,524,109 B2 | 4/2009 | Gardner et al. | |
| 7,532,056 B2 | 5/2009 | Seo | |
| 7,579,898 B2 | 8/2009 | Soldera et al. | |

(Continued)

OTHER PUBLICATIONS

U.S. Appl. No. 13/628,814, Sanchez, H., "Thermal Sensor System and Method Based on Current Ratio", Office Action—Notice of Allowance, mailed Jun. 30, 2015.

(Continued)

*Primary Examiner* — Mirellys Jagan

(57) ABSTRACT

A thermal sensor system including at least one thermal sensor, a voltage control network, a current gain network, a current compare sensor, and a controller. The voltage control network applies reference and delta voltage levels to a thermal sensor, which develops reference and delta current signals. The current gain network is used to adjust current gain. The current compare sensor is responsive to the reference and delta current signals and provides a comparison metric. The controller selects a temperature subrange and controls the current gain network to adjust the gain of the delta current signal to determine a gain differential value indicative of the temperature. The controller may select from among different sized thermal sensors, current mode gain values, and control voltages corresponding with each of multiple temperature subranges. Any one or more of these parameters may be adjusted to adjust an operating point for selecting a corresponding temperature subrange.

11 Claims, 10 Drawing Sheets

(56) References Cited

U.S. PATENT DOCUMENTS

| | | | |
|---|---|---|---|
| 7,581,881 | B2 | 9/2009 | Kim et al. |
| 7,636,009 | B2 | 12/2009 | Jo et al. |
| 7,808,068 | B2 | 10/2010 | Hartley |
| 7,887,235 | B2 | 2/2011 | Campos et al. |
| 7,920,015 | B2 | 4/2011 | Chellappa |
| 7,953,569 | B2 | 5/2011 | Jeong |
| 8,262,286 | B2 | 9/2012 | Peterson et al. |
| 8,308,358 | B2 | 11/2012 | Doorenbos |
| 8,432,214 | B2 | 4/2013 | Olmos et al. |
| 8,475,039 | B2 | 7/2013 | Chern et al. |
| 2011/0255568 | A1 | 10/2011 | Swei |
| 2013/0121377 | A1 | 5/2013 | Furnichi |
| 2014/0086277 | A1 | 3/2014 | Sanchez et al. |
| 2014/0086279 | A1 | 3/2014 | Cao et al. |

OTHER PUBLICATIONS

Aita et al., "Low-Power CMOS Smart Temperature Sensor With a Batch-Calibrated Inaccuracy of ±0.25° C. (±3σ) from -70° C.," IEEE Sensors Journal, vol. 13, No. 5, May 2013, pp. 1840-1848.

Andreou et al., "A Novel Wife-Temperature-Range, 3.9ppm/C CMOS Bandgap Reference Circuit," IEEE Journal of Solid-State Circuits, vol. 47, No. 2, pp. 574-581, Feb. 2012.

Duarte et al., "Temperature Sensor Design in a High Volume Manufacturing 65nm CMOS Digital Process," IEEE 2007 Custom Integrated Circuits Conference (CICC), pp. 221-224.

Jeong et al., "Process Compensated CMOS Temperature Sensor for Microprocessor Application," 2012 IEEE, pp. 3118-3121.

Kim et al., "A Smart Temperature Sensor with an Internal CMOS Bandgap Reference Circuit and Clock Oscillators," Center for Distributed Sensor Networks, Gwanju Institute of Science and Technology (GIST), 261 Cheomdan-gwagiro, Buk-gu, Gwangju 500-712, Korea, 2008.

U.S. Appl. No. 14/258,629, Ramaraju, R., "Temperature Sensor Circuitry", filed Apr. 22, 2014.

Kim, Chan-Kyung et al. "CMOS Temperature Sensor with Ring Oscillator for Mobile DRAM Self-refresh Control." 2008 IEEE. 978-1-4244-1684-4/08 pp. 3094-3097.

Sabastiano, F. et al. "A 1.2V 10 μW NPN-Based Temperature Sensor in 65nm CMOS with an Inaccuracy of ±0.2° C. (3σ) from -70° C. to 125° C.", © 2010 IEEE International Solid-State Circuits Conference pp. 1-28.

| TEMPERATURE RANGE MODE SELECT | | | | | |
|---|---|---|---|---|---|
| TEMPERATURE SUBRANGE (°C) | VD | RSEL | MA | MB | DAC_REF |
| 100 - 125 | VH1 | VL1 | DH | MA1 | MB1 | DR1$_1$ - DR1$_4$ |
| 70 - 100 | VH2 | VL2 | DH | MA2 | MB2 | DR2$_1$ - DR2$_4$ |
| 40 - 70 | VH3 | VL3 | DL | MA3 | MB3 | DR3$_1$ - DR3$_4$ |
| 0 - 40 | VH4 | VL4 | DL | MA4 | MB4 | DR4$_1$ - DR4$_4$ |

| TEMPERATURE VERSUS GAIN LOOKUP TABLE ||| |
|---|---|---|---|
| SUBRANGE INDEX | TEMPERATURE (°C) | IDAC GAIN (G) | |
| 1<br>(100 - 125 °C) | 128<br>124<br>...<br>100 | $G1_{128}$<br>$G1_{124}$<br>...<br>$G1_{100}$ | ←1000 |
| 2<br>(70 - 100 °C) | 106<br>102<br>...<br>70 | $G2_{106}$<br>$G2_{104}$<br>...<br>$G2_{70}$ | |
| 3<br>(40 - 70 °C) | 76<br>72<br>...<br>40 | $G3_{76}$<br>$G3_{74}$<br>...<br>$G3_{40}$ | |
| 4<br>(0 - 40 °C) | 44<br>40<br>...<br>0 | $G4_{44}$<br>$G4_{40}$<br>...<br>$G4_{0}$ | |

THERMAL SENSOR SYSTEM AND METHOD BASED ON CURRENT RATIO

CROSS REFERENCE TO RELATED APPLICATIONS

This application is related to the co-pending U.S. patent application entitled THERMAL SENSOR SYSTEM AND METHOD BASED ON CURRENT RATIO, Serial Number (NS30157HC) which is concurrently filed herewith, which has a common assignee and at least one common inventor, and which is incorporated by reference herein for all intents and purposes.

BACKGROUND OF THE INVENTION

1. Field of the Invention

The present invention relates generally to thermal sensors, and more particularly to a thermal sensor system that determines a current ratio through one or more thermal sensors for measuring temperature and which adjusts one or more operating parameters to extend the overall temperature range.

2. Description of the Related Art

Conventional thermal (or temperature) sensors may rely upon the thermal coefficient of resistance requiring per-part calibration. Some sensors sense the analog voltage difference between 2 sensors at a fixed current as a metric for temperature variability. Most sensors rely on PTAT (proportional to absolute temperature) voltage relationships, whereas others rely on PTAT and CTAT (complementary to absolute temperature) comparisons. Accurate thermal monitoring usually requires either large area circuitry and/or the use of fabrication-enabled calibration of analog components (i.e. trimming or fuse controls). These solutions tend to be costly, either in terms of needing significant die area or requiring significant additional support (e.g., test, PE, bringup, etc.). It is also desired to accurately measure temperature within a large temperature range.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
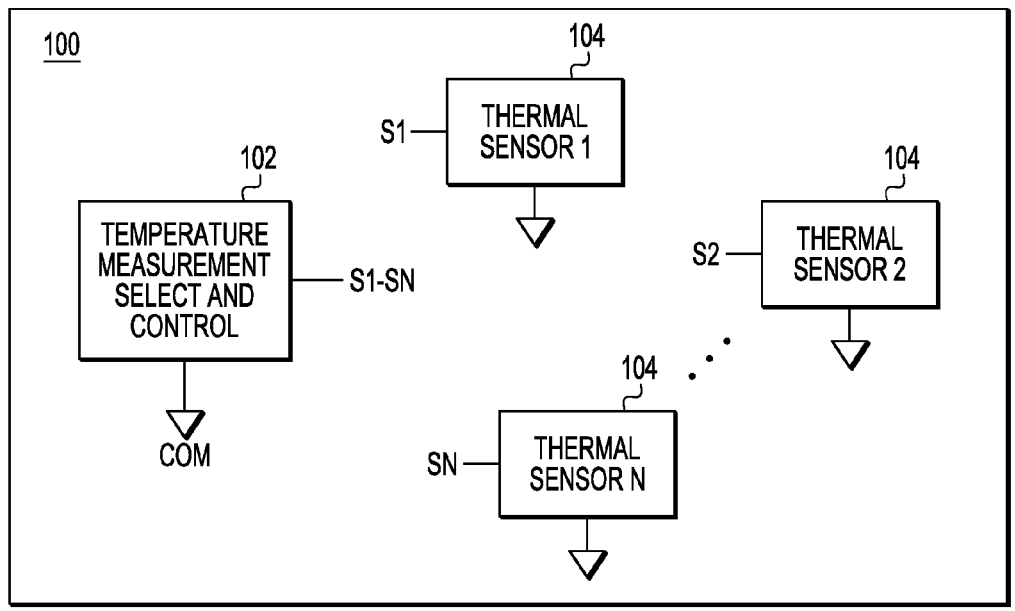
FIG. 1 is a simplified block diagram of an electronic system including a temperature measurement select and control block and one or more thermal sensor blocks implemented according to one embodiment.

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

A thermal sensor system disclosed herein provides a compact, digital-friendly, thermal measurement system that does not require explicit calibration or fuses and that is relatively insensitive to process and source voltage. It accomplishes this by using a network developing currents derived through one or more thermal sensors. The indicator of temperature, however, is not the actual measured current at one operating voltage applied to the thermal sensor, but the ratio of currents for two different applied voltages. The voltages may be applied sequentially at two different times to the same sensor or simultaneously to two different sensors. In one embodiment, the ratio of current may be determined by adjusting a gain value and using a comparator or the like to sense relative current values. In another embodiment, the ratio of current may be determined by adjusting gain and using a voltage controlled oscillator (VCO) or the like to sense the relative current. In general, temperature is derived based on a ratio of current levels and/or periods that result with application of at least two different voltage levels applied to at least one thermal sensor. The ratio factors tend to cancel out process and other implementation specific parameters.

In various embodiments, one or more diodes are used as the thermal sensor(s). The current level of a forward-biased diode varies exponentially so that the overall current change through a diode of a given size may be limited to a corresponding current range. In a fixed configuration, the limited current range limits measurement to within a corresponding temperature range. Special techniques could be used to extend the temperature range while achieving accuracy, such as mechanisms enabling post-fabrication tuning or the like. Also, since the current of a forward-biased diode changes by order of magnitude and the temperature is otherwise not known in advance, circuit reliability issues should be resolved to prevent over-current conditions which may further cause malfunction or even catastrophic failure of one or more devices or components.

At least one embodiment operates with multiple configuration modes to increase the temperature range while providing accuracy and reliability management. Each configuration mode has a different device size, a different "effective" device size, and different diode voltages which are collectively optimized for a different temperature subrange within an extended temperature range. Logic control manages the transition between the modes based on sensing parameters indicative of the temperature. At least two different sized thermal sensors may be used to adjust device size. The effective device size may further be adjusted by adjusting bias gain. Further, the reference and delta voltages may both be adjusted for each particular temperature subrange. For example, the thermal sensor voltages may be increased at the lower temperature subranges to increase corresponding thermal sensor currents, and decreased the higher temperature subranges to decrease corresponding thermal sensor currents to maintain current limits within optimal operating levels. Any one or more of these methods may be used alone or in combination to increase the overall temperature range by any practicable amount.

FIG. 1 is a simplified block diagram of an electronic system 100 including a temperature measurement select and control block 102 and one or more thermal sensor blocks 104 implemented according to one embodiment. As shown, N thermal sensors 104, individually numbered thermal sensor 1, thermal sensor 2, . . . , thermal sensor N, are distributed in the system in which N is any positive integer greater than zero. Each thermal sensor 104 is located at a corresponding "site" for determining the temperature at that location, and develops a corresponding sense signal S1-SN provided to the temperature measurement select and control block 102. The temperature measurement select and control block 102 accesses and activates a selected one or more of the thermal sensors 104 for determining temperature at the corresponding one or more sites.

The electronic system 100 may be implemented on an integrated circuit (IC) or chip such as, for example, within a system-on-chip (SOC) or as part of an embedded processing system or the like. In this case, multiple thermal sensors 104 may be provided to determine the temperature at corresponding locations of the chip. Alternatively, the electronic system 100 may be implemented in a discrete manner in which the temperature measurement select and control block 102 and the one or more thermal sensors 104 may each be implemented on a separate integrated circuit (IC) or otherwise may include any combination of one or more ICs or semiconductor chips or the like. The electronic system 100 may be configured for any type of application, such as communication systems, computer systems, sensing devices, etc., and for any one or more of consumer, industrial, commercial, computing, and/or automotive fields.

Although multiple thermal sensors 104 are shown, N may also be one for a configuration with only one thermal sensor 104. The thermal sensors 104 are each depicted herein as a diode (PN junction), although it is understood that alternative sensor types or configurations are possible, such as a diode-coupled PNP bipolar junction transistor (BJT) or an NPN transistor or the like.

Figure 2:
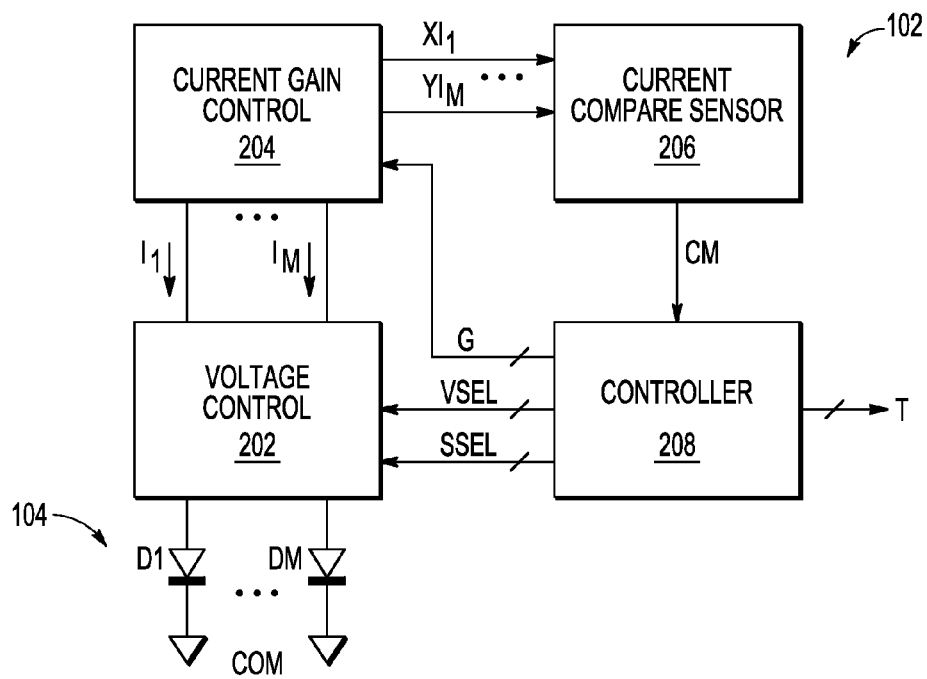
FIG. 2 is a block diagram of the temperature measurement select and control block of FIG. 1 implemented according to one embodiment for interfacing one or more of the thermal sensors shown implemented as "M" diodes, individually labeled D1, . . . , DM.

FIG. 2 is a block diagram of the temperature measurement select and control block 102 implemented according to one embodiment for interfacing one or more of the thermal sensors 104 shown implemented as "M" diodes, individually labeled D1, . . . , DM. The thermal sensing diodes described herein are shown referenced to a ground or COM (cathode coupling), where it is understood that alternative configurations are contemplated, such as referencing the anodes to an upper source voltage such as VDD or the like. The circuitry applying voltage may be modified accordingly to achieve the same or similar results. The number M is also a positive integer greater than zero and may be the same or different from N. In one embodiment, for example, each thermal sensor 104 incorporates multiple individual thermal sensing devices in which M is a multiple of N. Alternatively, M=N in which each thermal sensor 104 includes one thermal sensing device. A voltage control block 202 applies one or more different reference and offset voltages to a corresponding one or more of the diode(s) D1-DM to develop corresponding reference and offset currents $I_1$-$I_M$ sensed by a current gain control block 204.

The current gain control block 204 applies corresponding gains (e.g., X, . . . , Y) to each of the currents $I_1$-$I_M$ to develop corresponding currents $XI_1$-$YI_M$ to a current compare sensor 206. In one embodiment, X=Y in which the same gain value is applied to each current. In another embodiment, a different gain value may be applied to each current in which X, . . . , Y denote corresponding and possibly different gain values. The current compare sensor 206 compares amplified current values and develops at least one comparison metric CM to a controller 208.

The controller 208 controls the voltage control block 202 and the current amplification control block 204 while monitoring the comparison metric CM for making a thermal measurement at a selected site. In one embodiment, the controller 208 applies a site select value SSEL to select a diode at a selected site or location. The controller 208 asserts a voltage select value VSEL for selecting voltage applied to the selected diode. In one embodiment, the controller 208 asserts a gain value G to the current gain control block 204 for adjusting gain of an offset current relative to a reference current to provide a corresponding gain differential value which is indicative of a ratio of the reference and offset currents. The "values" described herein may be digital values, although analog value or signals are also contemplated. In one embodiment, the comparison metric CM is an output of a comparator which indicates a threshold condition. In an alternative embodiment, the comparison metric CM is a frequency signal output of a controlled oscillator, such as a VCO or current-controlled oscillator (ICO) or the like. The controller 208 monitors the comparison metric while adjusting gain to determine a gain differential value. The gain differential value may then be used to determine the temperature provided as an output value T.

The temperature measurement select and control block 102 is shown in generalized form and applies to any one or more of multiple embodiments or configurations. In one embodiment, for example, only one diode D1 may be provided in which the voltage control block 202 sequentially applies two different reference and offset voltage levels to the same diode, and the current compare sensor 206 compares corresponding amplified current values for providing CM. In an alternative embodiment, a pair of diodes (e.g., D1 and D2) may be provided at each site in which the voltage control block 202 simultaneously applies the reference and offset voltage levels to the two different co-located diodes, and the current compare sensor 206 compares the corresponding amplified current values for providing CM.

In one embodiment, for example, each thermal sensor 104 at each of the sites may include a single sensor, such as a single one of the diodes D1-DM, in which case the controller 208 controls the voltage control block 202 to sequentially apply a reference voltage level and an offset voltage level to the single diode for making a temperature measurement. In another embodiment, each thermal sensor 104 at each of the sites may include at least a pair of equivalent (or matched) diodes, in which the controller 208 controls the voltage control block 202 to apply the reference and offset voltage levels to the pair of diodes for making a measurement at that location. In yet another embodiment, each thermal sensor 104 at each of the sites may include at least a pair of diodes with significantly different sizes. As further described herein, since the current level of a forward-biased diode varies exponentially, any given diode may allow measurement only within a corresponding limited temperature range without exceeding maximum current limits. A different sized diode, along with different gain values and different diode voltage levels enables a different current range and thus a different temperature subrange. Thus, diodes of different sizes may be used to extend the overall temperature range for a given configuration.

Figure 3:
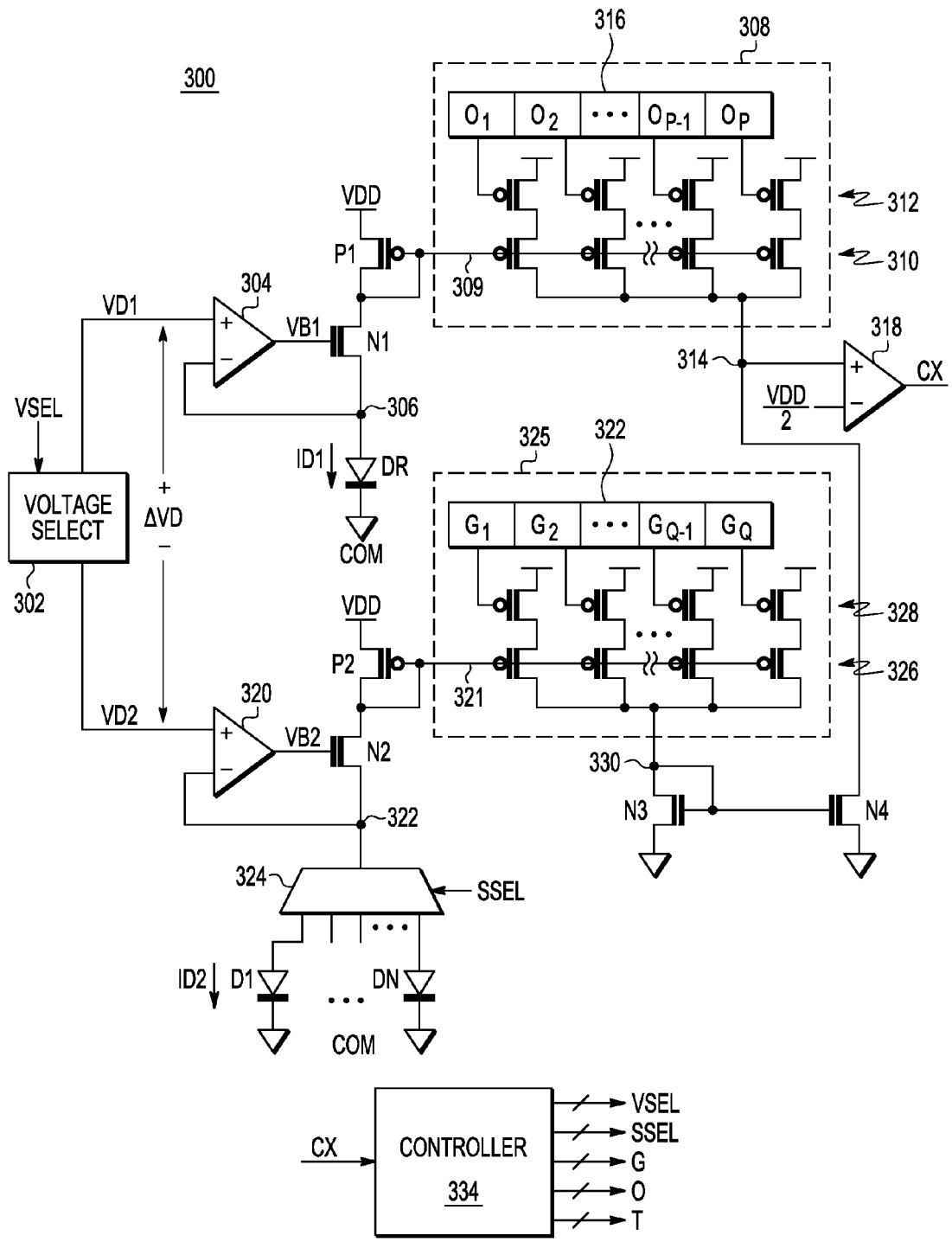
FIG. 3 is a schematic and block diagram of a temperature measurement select and control system according to one embodiment using a comparator which may be used as the temperature measurement select and control block of FIG. 1 coupled to N thermal sensing diodes.

FIG. 3 is a schematic and block diagram of a temperature measurement select and control system 300 according to one embodiment using a comparator which may be used as the temperature measurement select and control block 102 coupled to N thermal sensing diodes. A voltage select block 302 provides a first diode voltage VD1 to the positive input of a first amplifier 304, which has its negative input coupled to a node 306. Node 306 is coupled to the anode of a reference diode DR and to the source of an N-type field-effect transistor (FET) N1. The cathode of DR is coupled to a common node COM, which is any common positive, negative or ground reference voltage. An unlabeled triangular ground symbol is used throughout the Figures to denote COM unless otherwise specified. The output of the amplifier 304 asserts a bias voltage VB1 to the gate of N1, which has its drain coupled to the drain and gate of a P-type FET P1 at a node 309. The source of P1 is coupled to a source voltage, such as VDD or the like. VDD is a source voltage relative to COM and is represented in the Figures by a pull up horizontal line (e.g., labeled "VDD" coupled to the source of P1). An unlabeled pull up horizontal line symbol is intended to reference VDD unless otherwise specified.

Node 309 is further coupled to a compensation current digital to analog converter (IDAC) 308, which includes a first array 310 of P P-type FETs and a second array 312 of P P-type FETs. Each P-type FET of the array 310 has its drain coupled to a node 314 and its gate coupled to node 309. Each P-type FET of the array 312 has its drain coupled to a source of a corresponding P-type FET of the array 310 and its source coupled to the source voltage VDD. The gate of each P-type FET of the array 312 is coupled to a corresponding bit of an offset compensation register 316 storing a digital offset compensation value O with P bits $O_1, O_2, \ldots O_P$. Node 314 is coupled to the positive input of a comparator 318, having a negative input receiving a divided source voltage (e.g., VDD/2) and its output providing a compare metric CX.

The voltage select block 302 provides a second diode voltage VD2 to the positive input of a second amplifier 320, which has its negative input coupled to a node 322. Node 322 is coupled to the output of an analog multiplexer (MUX) 324 and to the source of an N-type FET N2. Each input of the MUX 324 is coupled to the anode of a corresponding one of N diodes D1, D2, ..., DN, each corresponding to one of the N thermal sensors 104. The cathode of each of the diodes D1-DN is coupled to COM. In an alternative embodiment in which there is only a single thermal sensor 104, the MUX 324 may be omitted and the diode is coupled directly to N2.

The output of the amplifier 320 asserts a bias voltage VB2 to the gate of N2, which has its drain coupled to the drain and gate of a P-type FET P2. The source of P2 is coupled to the source voltage VDD, and its gate is further coupled to a node 321 which is coupled to a primary IDAC 325. The IDAC 325 includes a first array 326 of Q P-type FETs and a second array 328 of Q P-type FETs. Each P-type FET of the array 326 has its drain coupled to a node 330 and its gate coupled to node 321. Each P-type FET of the array 328 has its drain coupled to a source of a corresponding P-type FET of the array 326 and its source coupled to the source voltage VDD. The gate of each P-type FET of the array 328 is coupled to a corresponding bit of a DAC gain register 332 storing a gain value G with Q bits $G_1, G_2, \ldots G_Q$. Node 330 is coupled to the drain and gate of another N-type FET N3 which has its source coupled to COM. The gate of N3 is coupled to the gate of another N-type FET N4 having its source coupled to COM and its drain coupled to node 314.

The CX output of the comparator 318 is provided as the comparison metric to the input of a controller 334, which has a first output providing a value VSEL to the voltage select block 302 for controlling assertion of the diode voltages VD1 and VD2, a second output providing a location or "site" select value SSEL to a control input of the MUX 324 for selecting one of the diodes D1-DN located at corresponding locations, a third output providing the offset compensation value O, a fourth output providing the gain value G, and a fifth output providing a determined temperature value T indicative of temperature. In one embodiment, each of the values VSEL, SSEL, G, O and T are multiple bit digital control values.

The voltage select block 302 may include one or more programmable voltage sources or one or more static voltage reference blocks for providing the diode voltages VD1 and VD2. In one embodiment, each programmable voltage source or static voltage reference block is implemented with at least one bandgap voltage reference source (programmable or static) providing a source or reference voltage which is independent of temperature to improve temperature measurement accuracy.

In one embodiment, the compensation IDAC 308 is generally matched with the primary IDAC 325. Thus, for example, each P-type FET of the arrays 310 and 312 is generally matched with a corresponding P-type FET in the arrays 326 and 328. In one embodiment, the IDACs 308 and 325 are both implemented in a linear fashion in which the current mirror legs are matched with each other so that each bit contributes about the same amount of current. In another embodiment, the IDACs 308 and 325 are both implemented in a binary weighted manner in which each successive current leg contributes a multiple level of current. Alternative current mirror gain configurations are contemplated and combinations of these and other methods are contemplated.

The temperature measurement select and control system 300 applies a first reference voltage to the reference diode DR and applies a second "delta" voltage to a selected site diode to develop a reference current in one current branch and a "delta" current in a second current branch. The temperature measurement select and control system 300 determines a gain differential value by applying gain to the delta current until the currents in the different branches substantially match each other. The gain differential value is thus indicative of the current ratio which may be used to determine the temperature value T indicative of temperature.

The voltage VD1 (used as the reference voltage) is applied to the reference diode DR via voltage-follower amplifier 304 to induce a first current ID1 (reference current) through DR, and the voltage VD2 (used as the delta voltage) is applied to a selected one of the diodes D1-DN via voltage-follower amplifier 320 to induce a second current ID2 (delta current) through the selected thermal sensor diode. P1, the offset compensation network 308, and N4 collectively operate to mirror and amplify ID1 into the node 314. Similarly, P2, the IDAC 325, N3 and N4 collectively operate to mirror and amplify ID2 into the node 314. The comparator 318 asserts CX responsive to a difference between the amplified and mirrored currents. As further described below, the controller 334 performs at least one procedure to match the current between the current mirror branches by adjusting relative gain between the branches, and then to determine the temperature value T based on the measured gain differential value.

The current ID through a diode D is determined according to the following equation (1):

$$ID = I_S \cdot AD \cdot e^{VD/VT} \quad (1)$$

where $I_S$ is the reverse bias saturation current (or scale current), AD is the area of the diode, VD is the diode voltage applied across the diode, and VT is the thermal voltage. The thermal voltage VT is determined as $VT = k \cdot T/q \cdot \propto$ in which k is the Boltzmann constant, T is the absolute temperature, q is the magnitude of charge of an electron, also referred to as the elementary charge, and $\propto$ is an ideality factor. The current ratio of two diodes D1 (or DR) and D2 (or a selected one of the diodes D1-DN) is determined according to the following equation (2):

$$\frac{ID1}{ID2} = \left(\frac{AD1}{AD2}\right) e^{\frac{\Delta VD}{VT}} \quad (2)$$

where ID1 is the current through diode D1, ID2 is the current through diode D2, AD1 is the area of the diode D1, AD2 is the area of the diode D2, and $\Delta VD$ is the difference of the diode voltages, or $\Delta VD = VD1 - VD2$. It can further be shown that the temperature T is determined according to the following equation (3):

$$T = \frac{\left(\frac{\Delta VD \cdot q}{k}\right)}{\ln\left(\frac{ID1 \cdot AD2}{ID2 \cdot AD1}\right)} \quad (3)$$

where "ln" denotes the natural logarithm. In this manner, T is proportional to the voltage difference and the ratios of the diode areas AD1 and AD2 and diode current ID1 and ID2.

The diode areas AD1 and AD2 and voltage difference $\Delta VD$ are predetermined or otherwise known. In various embodiments, the currents between the multiple branches are matched by adjusting current mirror gain in one branch so that the gain value difference is indicative of the relative current between the two diodes. In one embodiment, a mapping is determined between gain values and temperature values, so that the temperature may be determined using a corresponding gain value. In one embodiment, a lookup table (LUT) or the like is generated or otherwise provided, in which a gain differential value is used as an index to retrieve a corresponding temperature value. In an alternative embodiment, the temperature may be calculated or derived based on the gain differential value.

For both IDACs 308 and 325, a bit value of "1" pulls the gate of the corresponding P-type FET high (e.g., to VDD) and turns the corresponding current mirror leg off, whereas a bit value of "0" pulls the gate low (e.g., to COM) and turns it on. Each activated current mirror leg increases the gain of the current contributed to the common node 314. Thus, the digital values of O and G determine the current gain for each current mirror branch. As used herein, the "gain value" is considered in the opposite sense as the corresponding digital value in which the gain value is increased when the digital value is decreased (more 0s) and vice-versa. Thus, each current mirror has highest gain when the IDAC digital value includes all zeroes and has lowest gain (or is off) when the IDAC digital value includes all ones.

It is noted that at least one current mirror leg should be activated for each current mirror branch to allow at least a minimal amount of current flow to node 314. In an alternative embodiment, at least one leg is placed external to each IDAC 308 and 325 having its corresponding gate connection pulled low so that the leg remains turned on to ensure at least minimal current flow to node 314 for each current mirror branch.

In operation of the temperature measurement select and control system 300, the controller 334 may perform an offset compensation procedure prior to each temperature measurement to minimize any offset between the IDACs 308 and 325. Also, offset compensation minimizes any offset between the reference diode and the selected diode when in difference locations. Next, the controller 334 performs a temperature measurement procedure by adjusting circuit parameters including current mirror gain. Then the controller 334 uses the measured parameters, including the gain differential value, to retrieve, determine or otherwise calculate the temperature value T.

The controller 334 first asserts SSEL to select a corresponding one of the site diodes D1-DN. The controller 334 asserts VSEL to assert the diode voltages VD1 and VD2 to the same voltage level and also outputs initial digital values for the offset compensation value O and the gain value G. In one embodiment, the values of O and G are each initially set to the same "setpoint" value to initiate the offset calibration procedure. The setpoint value may be the midpoint of each IDAC 308 and 325 to allow the O value to be adjusted up or down for offset compensation. Alternatively, the setpoint value is closer to one end between the minimum and maximum digital values of each of the IDACs 308 and 325 to allow for a greater level of adjustment in the opposite direction. For example, for a 128-bit configuration, the digital midpoint value is 64 which may be used as the setpoint. The digital setpoint may be positioned, however, closer to one end of the overall digital range, such as the higher end for lower gain (e.g., 100), to allow sufficient headroom to adjust the O digital offset value higher or lower and then to allow a greater amount of room to reduce the digital G value to increase gain.

While monitoring CX, the controller 334 adjusts the offset compensation digital value O to determine the switch point of the comparator 318 indicating a substantially equivalent current through each of the current mirror branches (given the condition that VD1=VD2 for offset compensation). The digital G value remains at the initial setpoint. If CX is high, then the gain of the compensation IDAC 308 is too high and the gain of the IDAC 308 is reduced until CX switches low. Alternatively, if CX is low, then the gain of the compensation IDAC 308 is too low and the gain of the IDAC 308 is increased until CX goes high. In either case, the adjusted value of the offset compensation value O at the switching point of the comparator 318 minimizes any offset differential between the current mirror branches while the IDAC 325 is programmed at the setpoint. In this manner the adjusted value of the offset compensation value O minimizes discrepancies between the current branches.

After the offset compensation procedure is performed, the controller 334 adjusts VSEL to control the voltage select block 302 to drive VD1 to a reference voltage level and to drive VD2 to a delta voltage level to provide a voltage difference ΔVD between the two voltages. In one embodiment, the voltage level of VD2 is reduced while VD1 remains at the same level that it was at during the offset compensation procedure. In one embodiment, the reference voltage level is about 0.5V and the delta voltage level is 0.45V for a difference voltage ΔVD of 0.05V. The particular voltage levels are arbitrary and may be adjusted for different configurations. While monitoring CX, the controller 334 then "walks" the IDAC 325 by adjusting the gain value G until CX indicates the switch point of the comparator 318.

In one embodiment, the voltage of VD2 is reduced so that the current through the IDAC 325 of the lower current mirror is reduced relative to the upper reference current mirror and the CX value is pulled high. In this case, the gain value G is adjusted one bit at a time from the initial setpoint to incrementally increase gain until the comparator 318 switches state as indicated by CX being pulled low. The difference between the initial setpoint gain value and the final gain value when the comparator 318 switches state is indicative of the current ratio between the reference diode and the selected diode. The controller 334 then uses the gain differential value to obtain a corresponding temperature value T indicative of temperature.

In one embodiment, the controller 334 uses a memory, such as an LUT or the like (see, e.g., LUT 1000 of FIG. 10), to retrieve the corresponding temperature value. The gain differential value is applied as an index or address or the like into the memory to retrieve a corresponding temperature value. In an alternative embodiment, the controller 334 is configured to convert the gain differential value to the current ratio ID1/ID2, and to employ equation (3) or the like to calculate the temperature value. As previously described, ΔVD and AD2/AD1 are both known (or otherwise determinable) so that temperature is a relatively simple calculation. It is noted, however, that calculation circuitry may provide an unnecessary complication in favor of a simple and fast LUT configuration.

In an alternative embodiment, the compensation IDAC 308 is configured as (or otherwise replaced by) a static configuration. In one static configuration embodiment, the offset compensation register 316 is preprogrammed with the initial setpoint. In another static configuration, the compensation register 316 is not provided and instead the gates of the P-type FETs of the array 312 are hardwired according to the initial setpoint. In the static configuration, the P-type FETs of the arrays 310, 312, 326 and 328 may be configured as more precisely matched devices to improve measurement. In the static configuration, the offset compensation procedure may be bypassed or otherwise not performed.

After a temperature measurement, the controller 334 may select the same site or a different site by controlling SSEL and repeat the above process for making another temperature measurement.

Figure 4:
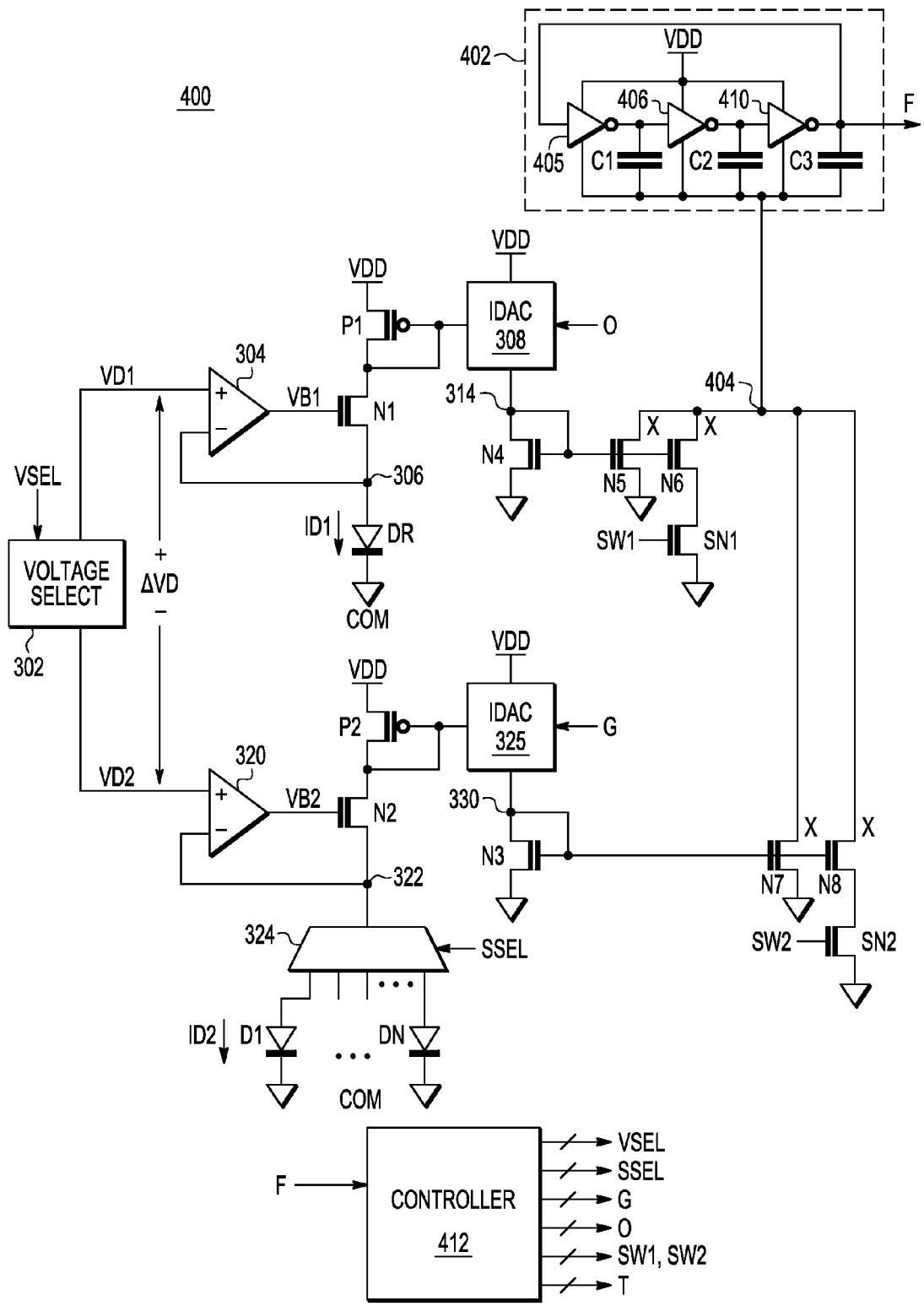
FIG. 4 is a schematic and block diagram of a temperature measurement select and control system according to a voltage controlled oscillator (VCO) embodiment which may be used as the temperature measurement select and control block of FIG. 1.

FIG. 4 is a schematic and block diagram of a temperature measurement select and control system 400 according to a VCO embodiment which may be used as the temperature measurement select and control block 102. The temperature measurement select and control system 400 is similar to the system 300 in which similar components are shown with the same reference designators. The voltage select block 302, the amplifiers 304 and 320, the reference diode DR, the devices N1, N2, P1 and P2, the IDACs 308 and 325, and the MUX 324 for selecting one of the N diodes D1-DN are provided and coupled to operate in similar manner.

The comparator 318 of the system 300 is replaced in the system 400 by a VCO 402 having an upper power node coupled to VDD and an output providing a frequency signal F. In this case, N4 is diode-coupled having its gate coupled to its drain at node 314, which is further coupled to the gates of additional N-type FETs N5 and N6. The drains of N5 and N6 are both coupled to a lower power node 404 of the VCO 402. The source of N5 is coupled to COM, and the source of N6 is coupled to the drain of another N-type FET SN1, having its source coupled to COM and its gate receiving a switch signal SW1. It is noted that alternative configurations for the VCO 402 and other VCOs described herein are contemplated, such as coupling the lower power node (e.g., 404) to ground or COM and coupling the upper power node to current mirror outputs to achieve the same or similar results.

The drain and gate of diode-coupled N3 coupled at node 330 are further coupled to the gates of additional N-type FETs N7 and N8. The drains of N7 and N8 are both coupled to the lower power node 404 of the VCO 402. The source of N7 is coupled to COM, and the source of N8 is coupled to the drain of another N-type FET SN2, having its source coupled to COM and its gate receiving a switch signal SW2.

N5-N8 are marked with an "X" denoting that each of these devices has the same size value, in which X denotes size or the relative amount of current that flows through the device when activated. SN1 and SN2 are both relatively large devices which are configured to have substantially zero drain to source voltage when switched on to minimize its effect on circuit operation.

Figure 7:
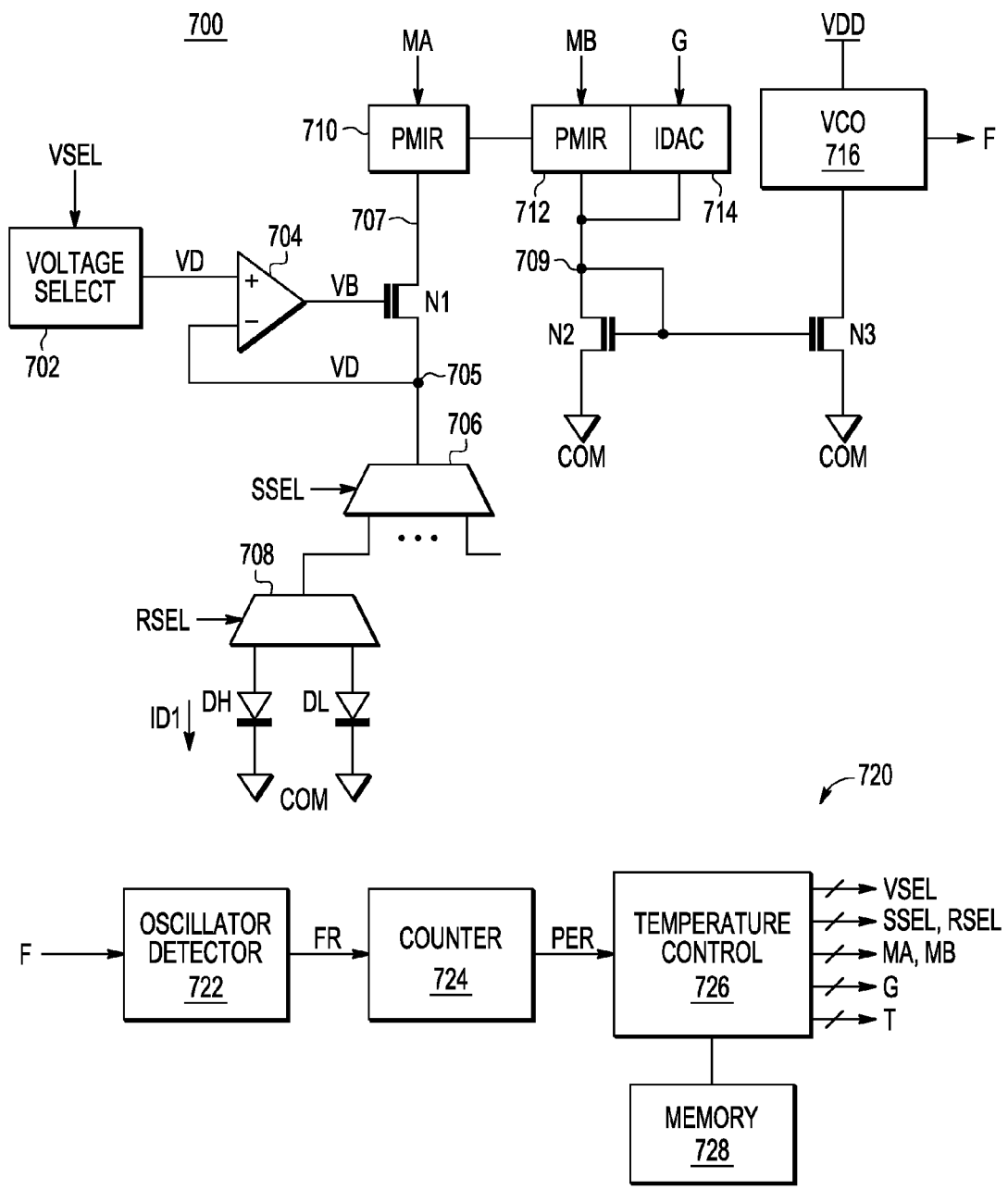
FIG. 7 is a schematic and block diagram of a temperature measurement select and control system according to another embodiment with programmable parameters to expand the overall temperature range which may be used as the temperature measurement select and control block of FIG. 1.

The controller 334 is replaced by a similar controller 412 which receives the output frequency signal F from the VCO 402. The controller 412 provides the VSEL, SSEL, G, O and T values in a similar manner, and further provides the switch signals SW1 and SW2. In one embodiment, the controller 412 incorporates a counter circuit or the like to measure the period of signal F in which the period is represented by a digital count value. A counter block 724 is illustrated in FIG. 7 for another VCO configuration although application is substantially similar.

The VCO 402 is shown implemented as a "ring oscillator" including an array of 3 series-coupled inverter gates 406, 408 and 410 in which the output of the last inverter 410 is fed back to an input of the first inverter 406. Each inverter has a positive supply voltage node coupled to node VDD and a negative power supply node coupled to the lower power node 404. Each inverter 406, 408, 410 has its output coupled to an input of the next inverter (forming a ring) and to one end of a corresponding capacitor C1, C2 and C3, in which each capacitor C1-C3 has its other end coupled to node 404. Each of the capacitors C1-C3 has a capacitance value which is independent of temperature. In one embodiment, for example, each of the capacitors C1-C3 is implemented as a metal capacitor that does not have a temperature coefficient.

The VCO 402 includes an odd number of inverters so that it oscillates at a frequency determined by the configuration of each of the inverters 406-410, the capacitance of the capacitors C1-C3, and the average current provided between VDD and node 404 by the remaining current mirror configuration. In one embodiment, the inverters and capacitors are in a fixed configuration. Although 3 inverters and corresponding capacitors are shown in the series-coupled configuration, it is understood that additional inverters and capacitors may be included depending upon the particular implementation.

The equation (3) provided above may be adjusted for the VCO configurations. The current of the VCO 402 is determined by its capacitance, the voltage across it, and its frequency (or period) of oscillation. The capacitors C1-C3 may be metal type capacitors or the like with no temperature coefficient. As described further below, the process takes two different measurements providing two different periods PER1 and PER2 of the F signal. The ratio of the periods is determined by the ratio of the voltage differences, the ratio of the areas of the diodes, the voltage difference ΔVD and the thermal voltage VT. It can be shown that the temperature may be determined according to the following equation (4):

$$T = \frac{\left(\frac{\Delta VD \cdot q}{k}\right)}{\left(\ln\left(\frac{PER1}{PER2}\right)\sqrt{\frac{ID1 \cdot \beta 2}{(ID2 \cdot \beta 1) \cdot \left(\frac{AD2}{AD1}\right)}}\right)} \quad (4)$$

where β1 and β2 are the MOS transistor gain factors of the MOS devices of the inverters 406, 408 and 410 of the VCO 402. The "beta" factors or transistor gain factors are determined by channel carrier mobility, gate insulator permittivity, gate insulator thickness, and the channel dimensions of the transistor devices. Although the beta factors are process dependent, they are both the same factor for the same VCO for the two different measurements. Furthermore, they cancel each other since provided in a ratio in equation (4).

As described further herein, the measurement process for the temperature measurement select and control system 400 using the VCO 402 adjusts gain in a similar manner previously described between two different measurements to equalize the frequency and thus the periods of oscillation. In this manner, the resulting gain differential value may be used in a similar manner previously described to obtain a temperature value which is independent of circuit parameters including process variations and source voltage. The temperature value may be obtained using a LUT or the like or may be calculated as previously described.

Operation of the temperature measurement select and control system 400 is similar to that described for the temperature measurement select and control system 300. The controller 412 performs an offset compensation procedure prior to each temperature measurement to minimize any offset between the IDACs 308 and 325. Next, the controller 412 performs a temperature measurement procedure by adjusting circuit parameters including current mirror gain. Then the controller 412 uses the gain differential value to determine the temperature value T indicative of temperature. Again, a LUT or the like may be used, such as one similar to the LUT 1000. A primary difference of the system 400 compared to the system 300 is that the output frequency F of the VCO 402 is used as an indicator of the difference in current between the diode pair.

The controller 412 asserts SSEL to select a diode at a corresponding site. The controller 412 then initiates the offset compensation procedure by programming the G value of the IDAC 325 to the initial setpoint value and by turning on the lower mirror configuration and by turning off the upper mirror configuration. In particular, the controller 412 asserts VSEL to set VD1 to 0V and to set VD2 to a predetermined higher voltage level (e.g., 0.5V). Furthermore, the controller 412 asserts SW1 to turn SN1 off and asserts SW2 to turn SN2 on. The additional current path through N8 effectively doubles (2×) the current through N7 applied to the VCO 402 for the lower current mirror configuration to achieve a more accurate and balanced offset compensation value. The controller 412 allows F to settle and then measures its period to obtain a baseline period value PER1.

The controller 412 then programs the O value of the compensation IDAC 308 at the initial setpoint value and turns off the lower mirror configuration and turns on the upper mirror configuration by asserting VSEL to set VD2 to 0V and to set VD1 to the predetermined higher voltage level. The G value remains at the initial setpoint value. Furthermore, the controller 412 asserts SW1 to turn SN1 on and asserts SW2 to turn SN2 off. Again, the additional current path through N6 effectively doubles (2×) the current through N5 applied to the VCO 402 for the upper current mirror configuration to achieve a more accurate and balanced offset compensation value. The controller 412 then monitors the period of F while adjusting the digital O value of the compensation IDAC 308 until the period of F is substantially equal to the baseline period value PER1. In one embodiment, the controller 412 adjusts O one bit at a time, waits for F to settle, measures the new period of F, compares the measured period with PER1, and determines whether additional adjustment is necessary and if so, the direction of the correction either up or down. When the new period of F substantially equals the baseline period PER1, then offset compensation is complete.

The controller 412 then initiates a current measurement by asserting SW1 and SW2 to turn both switches SN1 and SN2 off, and by asserting VSEL to adjust VD2 to the lower delta voltage level (e.g., 0.45V) to program the voltage difference ΔVD between VD1 and VD2. Thus, VD1 is at the reference voltage level and VD2 is at the delta voltage level It is noted that the current through N6 and N8 is turned off so that the collective current through N5 and N6 is again about 2× what it otherwise would be to obtain a balanced measurement. The controller 412 then adjusts the digital G value from the initial setpoint until the new period PER2 of F is substantially equal to the reference period PER1. In one embodiment, the controller 412 adjusts G one bit at a time, waits for F to settle, measures the new period of F, compares the measured period PER2 with the reference period PER1, and determines whether additional adjustment is necessary. Since VD2 is less than VD1, the gain is typically increased to achieve a matching current level. When the new period PER2 of F substantially equals the baseline period PER1, adjustment of the gain value G is completed and a final gain differential value is obtained.

The controller 412 then uses the difference between the final gain value and the initial setpoint gain value to determine the differential gain value indicative of the current ratio through the diodes. The differential gain value may then be used to obtain the temperature value T in a similar manner previously described.

The compensation IDAC 308 may be replaced by a static IDAC which is preprogrammed or hardwired in a similar manner previously described. For the static configuration, the offset compensation procedure may be bypassed.

Figure 5:
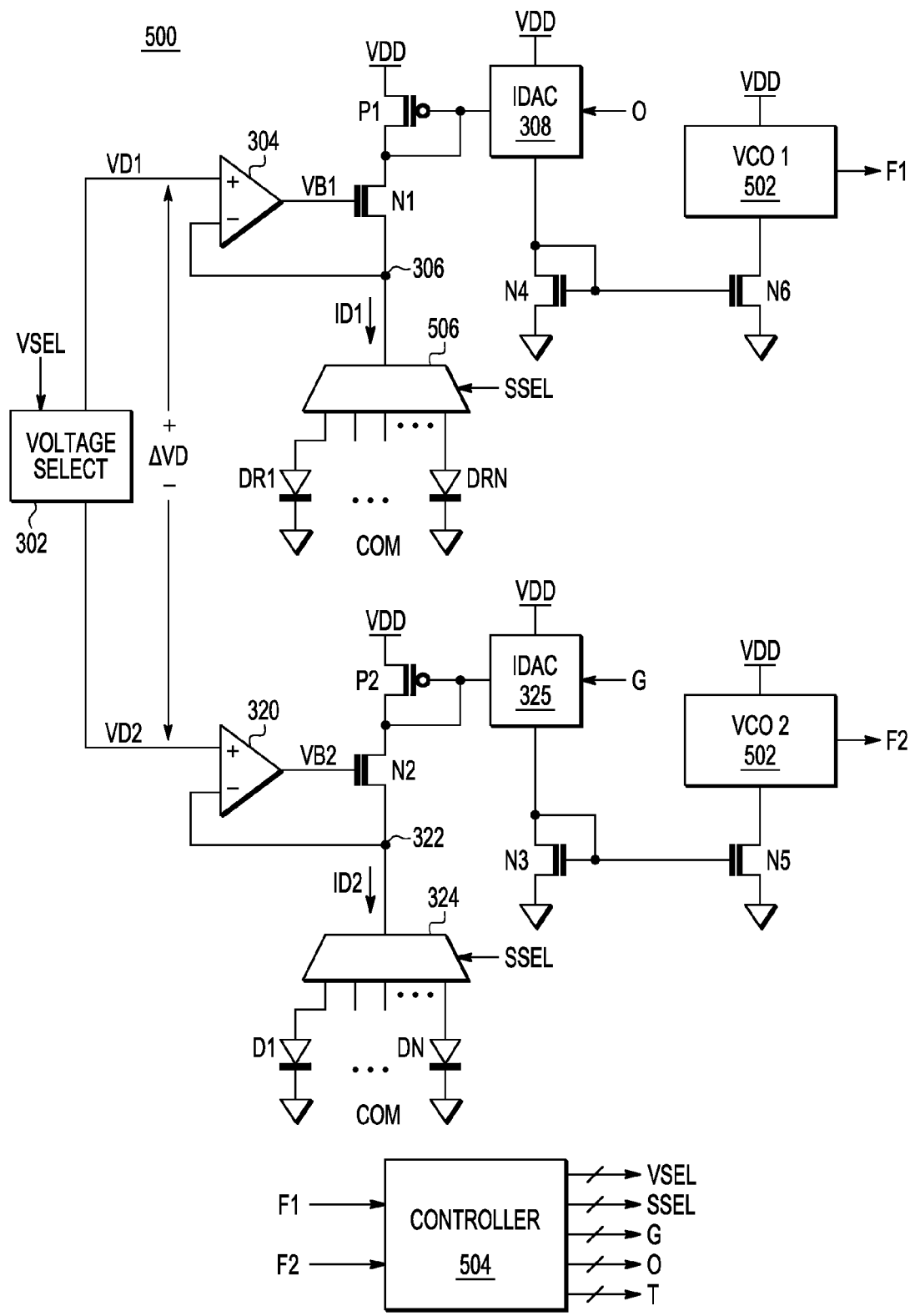
FIG. 5 is a schematic and block diagram of a temperature measurement select and control system according to another embodiment using a pair of VCOs which may be used as the temperature measurement select and control block of FIG. 1.

FIG. 5 is a schematic and block diagram of a temperature measurement select and control system 500 according to another embodiment using a pair of VCOs which may be used as the temperature measurement select and control block 102. The temperature measurement select and control system 500 has includes certain portions similar to the systems 300 and 400 in which similar components are shown with identical reference designators. The voltage select block 302, the amplifiers 304 and 320, the devices N1, N2, P1, and P2, the MUX 324 and the diodes D1-DN are coupled to operate in substantially similar manner. The IDACs 308 and 325 are also included and coupled in similar manner, except forming two separate current mirror configurations with a corresponding pair of VCOs 502, shown individually as VCOs 1 and 2. Each of the VCOs 502 may be configured in substantially similar manner as the VCO 402 previously described, and each have upper power nodes coupled to VDD.

The compensation IDAC 308 is coupled between the drain and gate of P1 and the drain and gate of N4 and receives the gain value O. N4 is diode-coupled with its source coupled to COM and its drain and gate further coupled to the gate of an N-type FET N6. The source of N6 is coupled to COM and its drain is coupled to the lower power node of VCO 1. The primary IDAC 325 is coupled between the drain and gate of P2 and the drain and gate of N3 and receives the gain value G. N3 is diode-coupled with its source coupled to COM and its drain and gate further coupled to the gate of an N-type FET N5. The source of N5 is coupled to COM and its drain is coupled to the lower power node of VCO 2. VCO 1 outputs a first frequency signal F1 and VCO 2 outputs a second frequency signal F2. A controller 504 is provided, which receives F1 and F2 and which provides the select values VSEL and SSEL, the gain values G and O, and the temperature value T.

In the illustrated embodiment of the system 500, the reference diode DR is replaced by N reference diodes DR1-DRN which are distributed with the diodes D1-DN, respectively. Thus, DR1 is co-located with D1, DR2 is co-located with D2, and so on. Another MUX 506 receives SSEL to select the corresponding co-located reference diode for each measurement. The use of the co-located reference diodes further reduces any error that may result from the pair of diodes not being located at the same site. The systems 300 and 400 may be modified accordingly in which the single reference diode DR is replaced by the MUX 506 and the co-located diodes DR1-DRN.

The controller 504 asserts SSEL to select one of the diodes D1-DN and a corresponding one of the reference diodes DR1-DRN, asserts VSEL to control the voltage select block 302 to control and apply the voltages of VD1 and VD2, and asserts the O and G values to program the IDACs 308 and 325 in substantially the same manner as previously described. In this case, however, the upper reference current mirror mirrors and amplifies current ID1 to drive the VCO 1 and the lower delta current mirror mirrors and amplifies current ID2 to drive the VCO 2 to develop first and second frequency signals F1 and F2 provided to the controller 504.

In operation of the temperature measurement select and control system 500, an offset compensation procedure is performed first followed by a temperature measurement procedure in a similar manner as previously described. For the offset compensation procedure, the controller 504 provides VSEL so that VD1=VD2 and programs both of the IDACs 308 and 325 with a predetermined setpoint value. The frequency signals F1 and F2 should have about the same frequency level if the current mirror branches were configured in substantially similar manner. The controller 504 adjusts the offset compensation value O while monitoring and comparing the periods of F1 and F2 until they are as close as reasonably possible for offset compensation. The offset compensation adjusts for any offset discrepancies between the two current mirror and VCO branches.

The controller 504 then adjusts VSEL so that VD2 is changed to the lower delta voltage level to develop the voltage difference ΔVD between VD1 and VD2, in which VD1 remains at the reference voltage level. The controller 504 then adjusts the gain value G from the initial setpoint value while monitoring F1 and F2 until they are as close as reasonably possible. The difference between the initial setpoint gain value and the final gain value of G determines the gain differential value which may then be used to determine the temperature value T indicative of temperature.

In an alternative configuration, after the offset compensation procedure, the controller 504 adjusts VSEL so that VD2 is changed to the lower delta voltage level to develop the voltage difference ΔVD between VD1 and VD2 for the temperature measurement procedure. Rather than further adjusting G, the controller 504 is configured to use the periods between F1 and F2 when the voltage difference ΔVD is applied. The difference between the periods may be used to retrieve a corresponding temperature value from an LUT or the like, or a temperature value may be calculated.

A difference between the temperature measurement select and control systems 400 and 500 is that system 500 uses two different VCOs for making the measurement. It is noted, however, that the VCOs 502 are configured in substantially the same manner and process variations are effectively canceled based on the ratio of beta values. Also, the co-located reference diodes may be used to improve temperature measurement accuracy at the cost of additional components.

Figure 6:
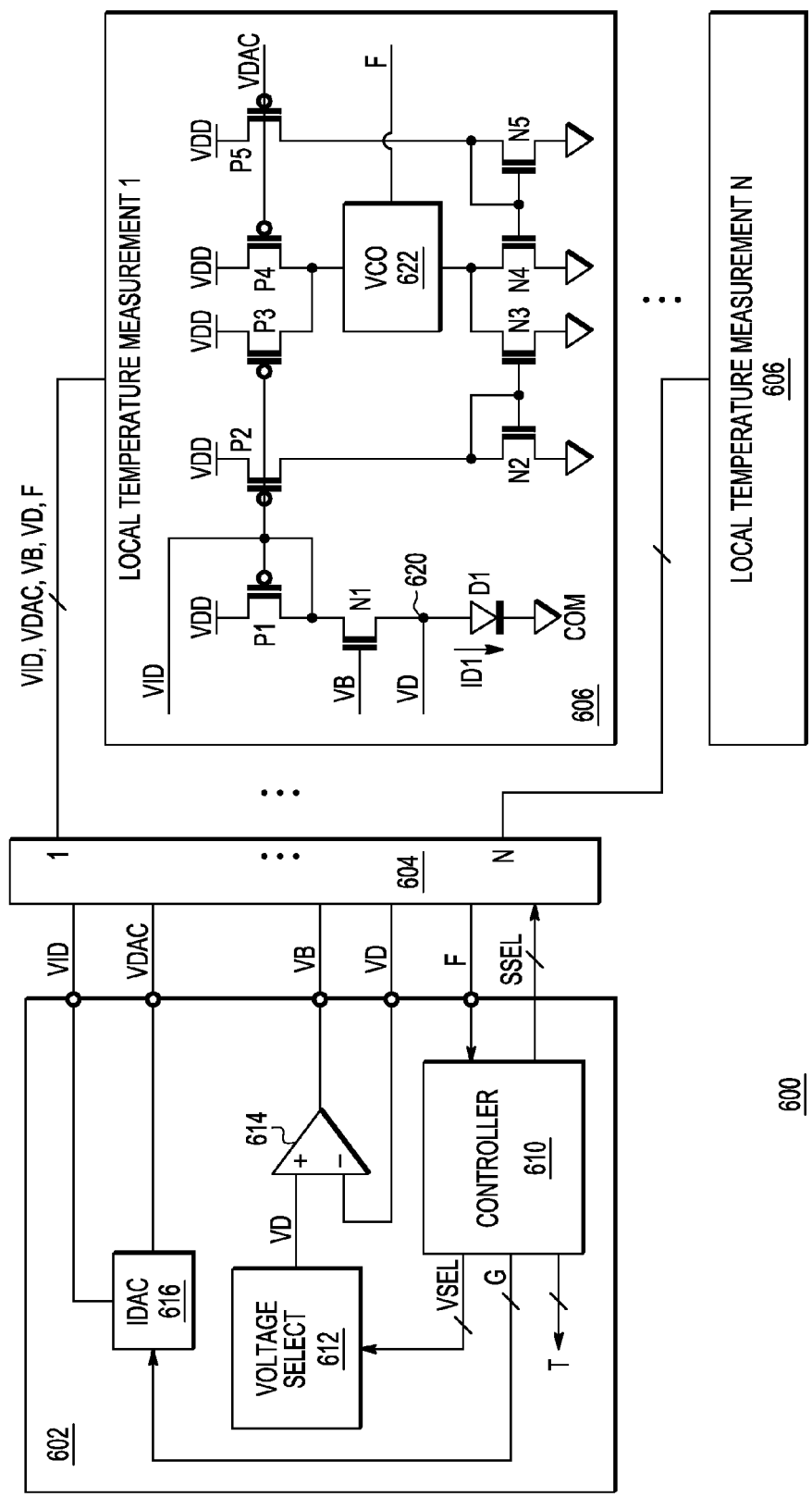
FIG. 6 is a schematic and block diagram of a temperature measurement system implemented according to an alternative embodiment in which a portion of the temperature measurement select and control block of FIG. 1 is instead distributed with each of the thermal sensors which are selectively coupled to a central temperature control block.

FIG. 6 is a schematic and block diagram of a temperature measurement system 600 implemented according to an alternative embodiment in which a portion of the temperature measurement select and control block 102 is instead distributed with each of the thermal sensors 104. The temperature measurement system 600 includes a central temperature control block 602, select logic 604, and one or more local temperature measurement networks 606 that are distributed at each location in which temperature is to be monitored and measured. A number N local temperature measurement networks 606 are shown, numbered 1, . . . , N, each configured in substantially the same manner, each interfacing the central temperature control block 602 via the select logic 604.

The central temperature control block 602 shares a common set of signals with any one of the local temperature measurement networks 606 when selected by the select logic 604. In one embodiment, the common set of signals includes an IDAC bias voltage VID, an IDAC voltage level VDAC, a bias voltage VB, a diode voltage VD, and a frequency signal F. The central temperature control block 602 asserts a site select value SSEL to select one of the local networks 606. The select logic 604 may be configured in any suitable manner, such as incorporating a switch matrix, a bus structure, multiplexor logic, or the like for interfacing the common signals between the central temperature control block 602 and a selected local network 606.

The central temperature control block 602 includes a controller 610, a voltage select block 612 (which operates in substantially the same manner as the voltage select block 302 previously described), an amplifier 614, and an IDAC 616.

The controller 610 asserts the SSEL value to a select input of the select logic 604 for selecting one of the local temperature measurement networks 606. The controller 610 asserts VSEL to instruct the voltage select block 612 to provide the diode voltage VD to the positive input of the amplifier 614. The output of the amplifier 614 provides the bias voltage VB to one terminal of the select logic 604 and has its negative input coupled to another terminal of the select logic 604. The amplifier 614 operates in a similar manner as previously described to develop the VD voltage across the sensor diode of a selected site, such as a diode D1 of the local temperature measurement block 1 606. The controller 610 asserts a digital gain value G to the IDAC 616, which provides a corresponding voltage VDAC to another terminal of the select logic 604. The IDAC 616 also interfaces the bias voltage VID, which is provided to another terminal of the select logic 604. The controller 610 receives the frequency signal F at another terminal of the select logic 604.

Further details of the local temperature measurement network 1 606 are shown, in which it is understood that each of the local temperature measurement networks 606 are configured in substantially similar manner. The local temperature measurement network 1 includes N-type FETs N1-N5, P-type FETs P1-P5, the local diode D1 and a local VCO 622. The VCO 622 may be configured in substantially similar manner as the VCO 402 previously described. The voltage VD is provided to a node 620 which is coupled to the anode of D1 and to the source of N1, in which the cathode of D1 is coupled to COM. The gate of N1 receives the bias voltage VB and its drain is coupled to the drain and gate of P1 having its source coupled to VDD. The gate of P1 is further coupled to the gates of P2 and P3, each having a source coupled to VDD. The drain of P3 is coupled to the drain of P4 and to an upper power node of the VCO 622. The gate of P4 receives the VDAC voltage and is further coupled to the gate of P5. The sources of P4 and P5 are coupled to VDD. The drain of P2 is coupled to the drain and gate of N2 and to the gate of N3. The drains of N3 and N4 are coupled together and to a lower power node of the VCO 622. The gates of N4 and N5 are coupled together and to the drains of N5 and P5. The sources of N2-N5 are coupled to COM. The VCO 622 generates the frequency signal F.

In operation of the temperature measurement system 600, when the local temperature measurement network 1 is selected by the controller 610, the amplifier 614 controls N1 to maintain the VD voltage across D1, in which D1 develops a diode current ID1. In this embodiment, a single diode is employed for temperature measurement rather than a pair of diodes. In this case, the reference voltage level is first applied at a first selected gain level to develop a reference current level for a first reference period measurement, which is followed by application of the delta voltage. The gain is adjusted until the new period matches the reference period to determine the gain differential value. P1-P3 and N2-N3 collectively operate to amplify and mirror the diode current through the VCO 622. The controller 610 provides G to the IDAC 616, which asserts corresponding voltage level of VDAC to the local temperature measurement network 1. P4-P5 and N4-N5 collectively operate to apply a corresponding current through the VCO 622.

The controller 610 asserts VSEL so that VD is at a first selected reference voltage level and also asserts G at a selected level so that the IDAC 616 asserts VDAC at a corresponding voltage level. In one embodiment, G is initially asserted at a predetermined setpoint level and the controller 610 measures the corresponding period of F as a reference period value PER1. The controller 610 then asserts VSEL to change VD to the delta voltage level (e.g., the lower voltage value). While monitoring the period of F, the controller 610 then adjusts G until the period PER2 of F is substantially equal to the reference period value PER1. In this manner, the difference between the initial and final gain values of G is indicative of the ratio of the current ID1 for the two different voltage levels applied to the same diode. The controller 610 then retrieves or calculates the temperature value T indicative of temperature using the gain differential value in a similar manner previously described.

The temperature measurement system 600 is similar to the systems 300 and 400 in that the same VCO is used for measurement. The temperature measurement system 600 is different in that a single diode is used for both measurements rather than two different diodes. Also, the illustrated temperature measurement system 600 does not employ offset compensation. It is noted that offset issues are less problematic for the system 600 since the same VCO, current mirror configuration and diode are used for making the measurements.

FIG. 7 is a schematic and block diagram of a temperature measurement select and control system 700 according to another embodiment with programmable parameters to expand the overall temperature range which may be used as the temperature measurement select and control block 102. A voltage select block 702 receives VSEL and provides a diode voltage VD in a similar manner as previously described. VD is provided to the positive input of an amplifier 704, which has its output providing a bias voltage VB to the gate of an N-type FET N2 and which has its negative input coupled to a node 705 which is further coupled to the source of N1 in a similar manner previously described. Node 705 is coupled to the output of a site select MUX 706 receiving site select value SSEL for selecting a site for temperature measurement. In one embodiment, each site has at least two diodes including a high temperature range diode DH and a low temperature range diode DL. A range select MUX 708 selects between the range diodes based on a range select signal RSEL.

The drain of N1 is coupled to a node 707, which is coupled to a first programmable P-type mirror block PMIR 710. PMIR 710 is further coupled to a second programmable P-type mirror block PMIR 712. PMIR 710 is programmed with a gain value MA and PMIR 712 is programmed with a gain value MB. PMIR 712 is further coupled to a node 709 which is coupled to the drain and gate of an N-type FET N2. An IDAC 714 receives a gain value G and is coupled to node 709. The source of N2 is coupled to COM and its gate and drain are further coupled to the gate of another N-type FET N3. N3 has its source coupled to COM and its drain coupled to the lower power node of an VCO 716. The upper power node of the VCO 716 is coupled to VDD and its output provides a frequency signal F. The VCO 716 may be configured in substantially similar manner as the VCO 402 previously described.

The temperature measurement select and control system 700 further includes a controller 720, which further includes an oscillation detector 722, a counter block 724, a temperature control block 726, and a memory 728. The oscillation detector 722 receives F at its input and provides a frequency signal FR at its output to the input of the counter block 724. The counter block 724 has an output providing a period value PER to the input of the temperature control block 726. The temperature control block 726 asserts the VSEL, SSEL and RSEL select values along with the gain values MA, MB and G, and receives the PER signal indicative of the period of F. The temperature control block 726 is configured to convert one or more each of the gain value(s) G and the corresponding PER values for determining and providing the temperature value T. As further described below, the memory 728 stores tabular values used for mode selection and includes at least one look-up table (LUT) for converting digital gain values to corresponding temperature values T.

As understood by the relationships previously described, the current of a forward-biased PN junction (e.g., diode) changes exponentially so that the temperature measurement range may potentially be limited to within a 30-40 degree temperature range with a static configuration. The system 700 is configured with multiple configuration modes for accurately measuring temperature within a relatively wide temperature range. Each configuration mode has a different device size, a different "effective" device size, and different diode voltages which are collectively optimized for a different temperature range. Logic control manages the transition among the modes based on measurement parameters indicative of the ambient temperature.

The size or area of the activated diode determines the device size. The diode DH has a size associated with higher temperature ranges and the diode DL has a different size which is associated with lower temperature ranges. In one embodiment, for example, the diode DH is smaller so that it develops a lower current for application of a given voltage level which is suitable for higher temperature ranges, whereas the diode DL is larger so that it develops a higher current for application of the same voltage level which is suitable for lower temperature ranges. PMIR 710 and PMIR 712 form a portion of the current mirror configuration with programmable mode gain in which each mode corresponds with a temperature subrange. Thus, the combination of gain values MA and MB determine the mode gain of the current mirror configuration thereby programming the effective device size. In one embodiment, for example, lower gain values result in lower current levels suitable for the higher temperature ranges, whereas higher gain values result in higher current levels suitable for the lower temperature ranges.

The use of the two programmable current mirror blocks PMIR 710 and 712 provides flexibility to achieve a desired temperature range and accuracy level for temperature measurements for each mode. In an alternative embodiment, only one of the blocks is programmable, in which the programmable block has an increased size to provide desired range and accuracy or otherwise may be used for configurations with reduced range or accuracy. N2 and N3 provide the N-type portion of the current mirror configuration. In alternative embodiments, either or both of the N2 and N3 devices may be replaced with corresponding programmable gain blocks in a similar manner as the PMIR blocks for increased range or accuracy.

The voltage select block 702 provides at least two different voltage levels (e.g., VDH and VDL) to measure temperature within each temperature subrange. In one embodiment, for example, the VDH and VDL values are lower to develop reduced current levels for the higher temperature ranges, whereas the VDH and VDL values are higher to develop increase current levels for the lower temperature ranges. In one embodiment, VDH provides the reference voltage level and VDL provides the delta voltage range for a given temperature subrange.

Operation of the temperature measurement select and control system 700 as controlled by the controller 720 is similar to that previously described for the alternative embodiments for each temperature subrange. Current developed through a selected diode is mirrored and amplified to develop a corresponding operating voltage of the VCO 716, which outputs F at a corresponding frequency level. The gain value G provides a search gain which is adjusted within each temperature range while monitoring the periods of F to search for the actual temperature. The temperature control block 726 asserts SSEL to select a site for temperature measurement, and further asserts the RSEL value and the MA and MB mode gain values for a selected temperature range. The temperature control block 726 then asserts VSEL for the corresponding diode voltages and adjusts the gain value G provided to the IDAC 714 to measure temperature within the selected range. If the gain value G of the IDAC 714 goes out of range during the measurement, then the actual temperature is not within the selected range and a new temperature range is selected.

In one embodiment, the overall temperature range is about 0° C. (Celsius) to about 125° C., which is further subdivided into temperature subranges 0-40° C., 40-70° C., 70-100° C., and 100-125° C. It is noted that the settings for the lower temperature subranges may result in excessively high current if the actual ambient temperature is high. Thus, if the system parameters are set for low temperature range measurement when the actual temperature is significantly higher, excessive currents may cause over-current conditions which may further cause malfunction or even catastrophic failure of one or more devices or components. In this manner, temperature measurement search is successively performed from the higher temperature subranges towards the lower temperature subranges to ensure circuit operation reliability.

It is noted that if the actual temperature is low when the temperature measurement search is performed at a higher temperature subrange, then the resulting current may be too low to develop sufficient voltage to operate the VCO 716. Thus, the VCO 716 may fail to oscillate which might otherwise cause a misreading and/or a non-reading by the counter block 724. The oscillation detector 722 determines whether the F signal is oscillating and asserts FR accordingly. If the oscillation detector 722 determines that F is oscillating, it passes the F signal unmodified as the FR signal. If, however, the oscillation detector 722 determines that F is not oscillating, then the oscillation detector 722 generates a relatively low frequency of FR to drive the counter block 724. The counter block 724 measures the period of FR and provides a corresponding count value PER to the temperature control block 726. If the temperature control block 726 detects PER above an expected range indicating non-oscillation of F, then it selects the next lower temperature subrange for measurement.

Figures 8, 9:
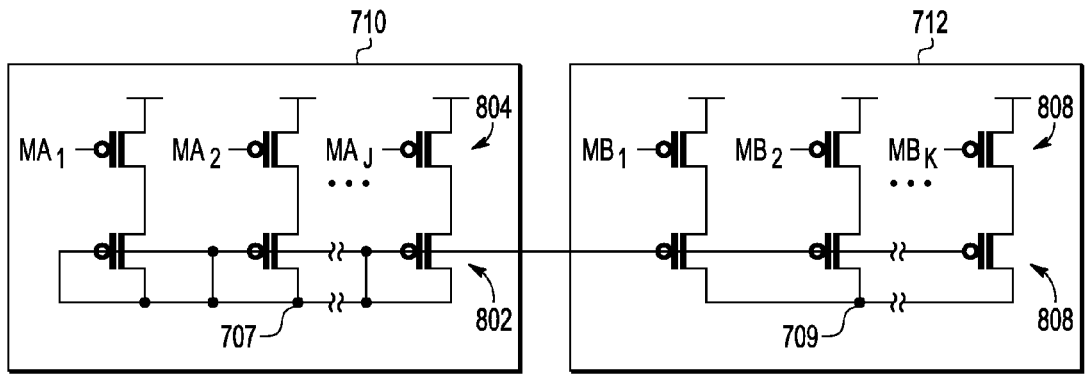
FIG. 8 is a schematic diagram of an exemplary embodiment of the programmable current mirror blocks of FIG. 7 implemented according to one embodiment.
FIG. 9 is a diagram of a temperature range mode select table that may be stored within the memory of FIG. 7 and which includes the values to facilitate mode selection for each of multiple predetermined temperature subranges.

FIG. 8 is a schematic diagram of an exemplary embodiment of the PMIR 710 coupled to an exemplary embodiment of the PMIR 712 according to one embodiment. The PMIR 710 includes a first array of an integer number J of P-type FETs 802 and a second array of J P-type FETs 804. Each P-type FET of the first array 802 has its gate and drain coupled to node 707, and its source coupled to the drain of a corresponding one of the P-type FETs of the second array 804. The source of each P-type FET of the second array 804 is coupled to VDD. The gate of each P-type FET of the second array 804 receives a corresponding bit of the digital mode gain value MA, shown as $MA_1, MA_2, \ldots, MA_J$.

The PMIR 712 is configured in substantially similar manner. The PMIR 712 includes a first array of an integer number K of P-type FETs 806 and a second array of J P-type FETs 808. Each P-type FET of the first array 802 has its drain coupled to node 709, its gate coupled to node 707, and its source coupled to the drain of a corresponding one of the P-type FETs of the second array 808. The source of each P-type FET of the second array 808 is coupled to VDD. The gate of each P-type FET of the second array 808 receives a corresponding bit of the digital mode gain value MB, shown as $MB_1, MB_2, \ldots, MB_K$.

Each bit of the gain values MA or MB turns on or off a corresponding leg of the array of P-type FETs to adjust the mode gain of the current mirror. When pulled high, the current mirror leg is turned off reducing current gain, and when pulled low, the current mirror leg is turned on increasing current gain. The use of both PMIR blocks 710 and 712 allows refinement of mode gain adjustment for more accurate temperature subrange selection.

The IDAC 714 may be implemented in a similar manner as the PMIR 712. As previously described, the IDAC 714 provides a search gain which is programmable and adjusted during each temperature measure search to search for the actual temperature within a selected temperature range.

FIG. 9 is a diagram of a temperature range mode select table 900 that may be stored within the memory 728 and which includes the values to facilitate mode selection for each of the predetermined temperature subranges. Each temperature subrange has corresponding reference (e.g., upper) and delta (e.g., lower) diode voltages for VD, a selected one of the diodes DH and DL determined by the temperature range RSEL value, corresponding mode gain values for MA and MB for programming the PMIR 710 and 712 for each temperature subrange, and at least one IDAC reference (DAC_REF) value as the initial gain value G for programming the IDAC 714. These values are determined based on a variety of factors and may further be determined empirically. In general, the values are selected to optimize the circuitry for accuracy of the temperature search within each temperature subrange.

For the upper subrange of 100-125° C., the VD, RSEL, MA, MB and DAC_REF values are VH1 & VL1, DH, MA1, MB1, and $SP1_1$-$SP1_4$, respectively. For the next higher range of 70-100° C., the VD, RSEL, MA, MB and DAC_REF values are VH2 & VL2, DH, MA2, MB2, and $SP\,2_1$-$SP\,2_4$, respectively. For the next temperature range of 40-70° C., the VD, RSEL, MA, MB and DAC_REF values are VH3 & VL3, DL, MA3, MB3, and $SP\,3_1$-$SP\,3_4$, respectively. For the lowest temperature range of 0-40° C., the VD, RSEL, MA, MB and DAC_REF values are VH4 & VL4, DL, MA4, MB4, and $SP\,4_1$-$SP\,4_4$, respectively.

The DAC_REF values are the initial values of G programmed into the IDAC 714 as an initial reference value during temperature measurement. The illustrated embodiment shows four DAC_REF values for each temperature subrange. In this case, each subrange may be further divided into four narrower temperature windows in which each window corresponds with one of the different DAC_REF reference values. The DAC_REF values may be determined during a calibration procedure, and may further be used during a temperature measurement procedure. During the calibration procedure, the temperature is known and an initial DAC_REF value is used as a reference point for a corresponding gain value for that temperature. Once the actual gain value is obtained, the DAC_REF value may be updated and the process repeated to achieve greater accuracy.

During the temperature measurement procedure, since the temperature is not initially known, a default value or one of the stored DAC_REF values are initially used for an initial temperature measurement. Once an initial temperature value is determined, the DAC_REF value for the corresponding temperature window range may be selected and the temperature procedure is repeated for a more accurate measurement. In alternative embodiments, more or less than four DAC_REF values are stored. In one embodiment, DAC_REF values are not stored and a default DAC_REF value is used.

Figures 10, 11:
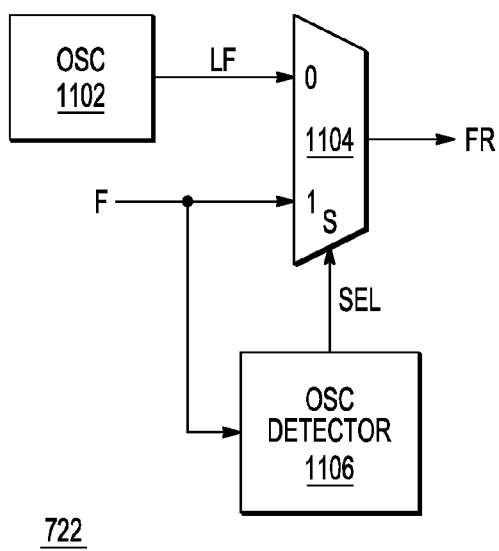
FIG. 10 is a diagram of a temperature versus gain lookup table which may be stored within the memory of FIG. 7 and which lists an IDAC gain differential value for selected temperature values within each temperature subrange of the overall temperature range.
FIG. 11 is a simplified block diagram of the oscillation detector of FIG. 7 according to one embodiment.

FIG. 10 is a diagram of a temperature versus gain lookup table (LUT) 1000 which may be stored within the memory 728 and which lists an IDAC gain differential value (or simply, gain value) for selected temperature values within each temperature subrange of the overall temperature range. The overall temperature range (e.g., 0-125) is subdivided into four different temperature subranges denoted by a subrange index. As shown, index 1 corresponds with temperature subrange 100-125° C., index 2 corresponds with temperature subrange 70-100° C., index 3 corresponds with temperature subrange 40-70° C., and index 4 corresponds with temperature subrange 0-40° C. In the illustrated embodiment, the selected temperatures within each subrange are separated by 4 degree increments rather than providing a gain value for each degree of temperature. Each listed temperature value corresponds with a gain value of the IDAC 714 in the form $GI_{TEMP}$, in which "I" denotes the subrange index and "TEMP" denotes the temperature in ° C. For example, a gain value $G2_{70}$ denotes an IDAC gain value G which corresponds with 70° C. within the temperate subrange index of 2 (70-100).

Alternative embodiments are contemplated in which the separation is more or less than 4 degrees, such as, for example, separation by only one or two degrees or five degrees or greater. 4 degree separation provides sufficient accuracy while reducing memory consumption as compared to providing a gain value for each degree of temperature. Intermediate temperature values may be interpolated by interpolating gain values as further described herein. Furthermore, the temperature ranges overlap each other to reduce possible misreading. As shown, the highest temperature of 128° C. of the first temperature subrange (index 1) is slightly greater than the target temperature range maximum of 125° C. Furthermore, each subsequent temperature subrange overlaps the previously higher temperature subrange by an overlap amount, such as by six degrees (6° C.). As shown, for example, the highest temperature of the second temperature subrange (index 2) is 106° C. which is greater than the lowest temperature (100° C.) of the first temperature subrange (index 1) by 6° C.

As described further herein, a calibration procedure is performed to program each lookup table for a given configuration, which may be a single lookup table for all sites or a separate lookup table for each site. During the calibration procedure, the external ambient temperature is controlled to a selected temperature corresponding with the lookup table, and a corresponding gain value is determined for that temperature and stored. During temperature measurement, each temperature subrange is searched one at a time from the higher temperature subrange to the lowest temperature subrange for a given site until a valid and final gain value is determined. The corresponding lookup table is referenced to retrieve a corresponding temperature, or to retrieve temperature values and corresponding gain values on either side of the measured gain value. The temperature may then be interpolated based on the retrieved gain and temperature values.

FIG. 11 is a simplified block diagram of the oscillation detector 722 according to one embodiment. A free-running oscillator 1102 provides a low frequency signal LF to one input of an analog MUX 1104, which receives the F signal at its other input. F is also provided to an input of an oscillation detection block 1106, and the output of the MUX 1104 provides the FR signal. The oscillation detection block 1106 asserts a select signal SEL to a select input S of the MUX 1104. In the illustrated embodiment, LF is provides to the "0" input of MUX 1104 and F is provided to the "1" input of the MUX 1104, in which "0" and "1" reflect the logic value of the SEL signal.

The oscillation detection block 1106 continuously, or periodically, monitors F for oscillation. When F is detected as oscillating, the oscillation detection block 1106 asserts SEL to select F as the output FR. When F is not oscillating, the oscillation detection block 1106 asserts SEL to select LF as the output FR. As previously noted, LF provides a sufficient clock signal for operating the counter block 724 to provide a count value PER at its output. When LF is selected as the FR signal, PER has a relatively low value indicating non-oscillation of F.

Figure 12:
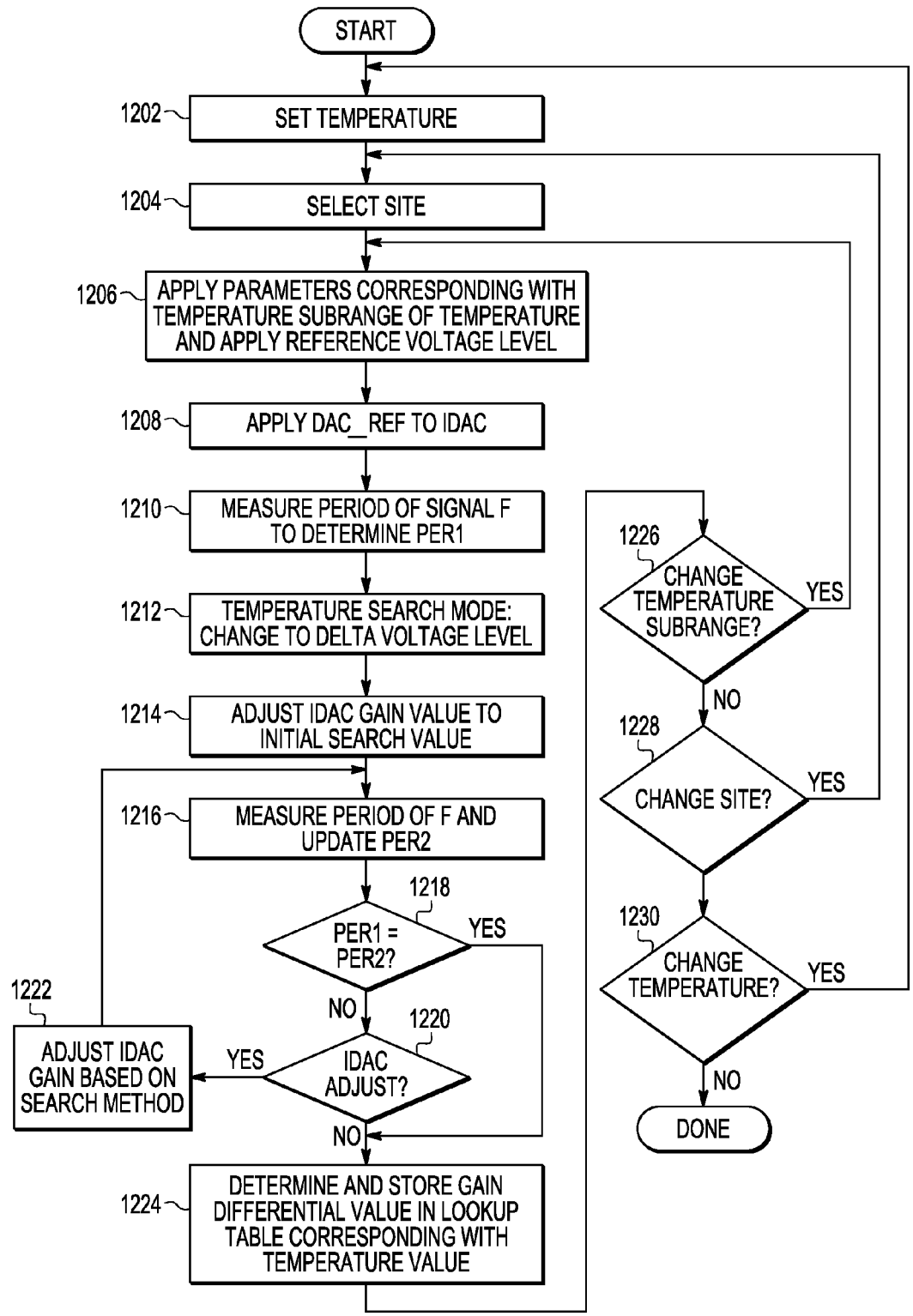
FIG. 12 is a flowchart diagram of a calibration procedure according to one embodiment which may be performed by the system of FIG. 7 for determining and storing gain values corresponding to temperature values.

FIG. 12 is a flowchart diagram of a calibration procedure according to one embodiment which may be performed by the system 700 for determining and storing gain values corresponding to temperature values. The electronic system 100 is located within a controlled temperature environment and the ambient temperature is externally controlled. At a first block 1202, the temperature (e.g., ambient temperature) is controlled to a particular temperature value which corresponds with the temperature values in the temperature lookup table, such as the LUT 1000. In one embodiment, the temperature may be initialized at one end of the overall temperature range (e.g., the lower end at 0° C.), and then adjusted (e.g., increased) at a selected rate (e.g., gradual rate) towards the opposite end. When the temperature reaches a value corresponding to an entry in the corresponding temperature lookup table, a calibration process may be performed for that temperature level.

At next block 1204, a site is selected by assertion of the SSEL value in the event that multiple sites are provided. This step may be omitted or bypassed when there is only one site. At next block 1206, the mode parameters that correspond with the temperature subrange of the actual temperature are applied. As an example, for the temperature measurement select and control system 700, the temperature sensor device size, the effective device size, and the initial diode voltage are programmed for the temperature subrange which corresponds with the actual temperature. As shown in table 900, for example, when the temperature is 0° C. within the first subrange of 0-40° C., the initial diode voltage is VD=VH4 (the reference voltage value for the lowest temperature subrange) controlled by VSEL, the initial device size is DL selected by RSEL, and the mode gain values MA4 and MB4 are selected and applied to the PMIR 710 and 712, respectively.

At next block 1208, an initial DAC reference value DAC_REF is selected as the gain value G and the IDAC 714 is programmed accordingly. The DAC_REF value may be stored in the memory 728 or may be a predetermined default value or the like. DAC_REF serves as a reference search gain value. At next block 1210, the period of the output frequency F of the VCO 716 is measured, which corresponds with a reference period PER1.

Operation then proceeds to next block 1212 to initiate the temperature search mode in which the diode voltage is changed to the delta voltage value, such as a lower diode voltage VD. As shown in table 900, for example, when the temperature is 0° C. within the first subrange of 0-40° C., the diode voltage is changed to VD=VL4 (the delta voltage value for the lowest temperature subrange) selected by VSEL. The change of diode voltage changes the diode current to a delta current level, which correspondingly changes the frequency of signal F at the output of the VCO 716. At next block 1214, the search gain value G is changed to an initial search value for the temperature search and programmed into the IDAC 714. At next block 1216, the period of the output frequency F of the VCO 716 is measured and a measured delta period PER2 is updated accordingly. At next block 1218, it is queried whether the reference and delta periods PER1 and PER2 are equal. If not, operation proceeds to block 1220 to determine whether additional gain adjustments are to be made to the IDAC 714, and if so, operation proceeds to block 1222 to adjust the gain of the IDAC 714. Operation then loops back to block 1216 to measure the period of F again to update PER2 to a new value. Operation loops between blocks 1216 and 1222 until PER1 and PER2 are equal or until it is determined that there are no further gain adjustments.

It is appreciated that various different methods may be used to implement gain adjustment and comparison as represented by the loop between blocks 1216 and 1222. It is noted that in a practical configuration, the resolution of the IDAC 714 may not be sufficiently high to ensure that the reference and value periods exactly match each other, so that the inquiry of block 1218 may often return false. Block 1218 may be modified to inquire whether the period values are within a predetermined tolerance level of each other. Alternatively, the search method is configured to determine the gain value that provides the closest match.

In one embodiment, a binary search method is performed to identify the closest match. The initial search value applied at block 1214 may have an initial value which is approximately in the middle of an initial search range. The initial search range may be, for example, the minimum (MIN GAIN) and maximum (MAX GAIN) gain values of the IDAC 714, in which the initial search value is the middle gain value MID GAIN determined as MID GAIN=(MIN GAIN+MAX GAIN)/2. If the period values do not match using MID GAIN, then block 1220 queries whether the frequency of F should be increased or decreased and a new, reduced search range is determined. For example, the new search range is the upper half of the original search range if the frequency should be increased (by setting MIN GAIN equal to MID GAIN), or the lower half of the search range if the frequency should be decreased (by setting MAX GAIN equal to MID GAIN). The MIN GAIN or the MAX GAIN value is adjusted accordingly, and a new MID GAIN value is determined at block 1222 using the same formulation MID GAIN=(MIN GAIN+MAX GAIN)/2, and evaluated at block 1216. Operation repeats until a final gain value is determined at either block 1218 (when equal) or block 1220 (when closest gain value determined or when no additional adjustments may be made).

As an example, assume that the IDAC 714 is 128 bits for a minimum value of 1 and a maximum value of 128 with a first MID GAIN value of 64. Also assume that the closest gain value is 86. At 64, PER1 and PER2 are not equal and PER1>PER2, so that the new range is between 64 and 128 with an updated MID GAIN value of 96. At 96, PER1 and PER2 are not equal and PER2<PER1, so that the new range is between 64 and 96 with an updated MID GAIN value of 80. At 80, PER1 and PER2 are not equal and PER2>PER1, so that the new range is between 80 and 96 with an updated MID GAIN value of 88. At 88, PER1 and PER2 are not equal and PER2<PER1, so that the new range is between 80 and 88 with an updated MID GAIN value of 84. At 84, PER1 and PER2 are not equal and PER2>PER1, so that the new range is between 84 and 88 with an updated MID GAIN value of 86. If PER1 and PER2 are equal as determined at block 1218, then the closest gain value has been determined as 86.

Although 86 is the closest value, it is possible, and even likely, that PER1 and PER2 are not equal as determined at block 1218. In this case, based on the comparison between PER1 and PER2, the final MID GAIN value is either 87 or 85. At this point, no further gain adjustments are necessary since narrowed down to only two values. In one embodiment, the final MID GAIN value of either 87 or 85 is accepted allowing for less than 1 degree of error. Alternatively, one or more of the period values corresponding to the determined PER2 values are temporarily stored and compared to identify the closest gain value, such as 86 in this particular example.

Alternative methods are contemplated, such as, for example, simply walking the IDAC 714 from its lowest gain value towards the highest gain value, or vice-versa, while comparing each PER2 period value to identify the closest gain value.

When either PER1=PER2 or there are no further gain adjustments to test, operation proceeds to block 1224 in which the gain differential value is determined and stored in the corresponding lookup table (e.g., LUT 1000) for a corresponding temperature value for the corresponding temperature subrange. The gain differential value is determined as the difference between the initial DAC_REF value and the final gain value of G. If the DAC_REF value is equivalent to a minimum gain value (e.g., gain of 0 or 1), then the final gain value may be stored instead. Operation may then proceed to block 1226 to inquire whether a different temperature subrange should be tested for the current temperature. As illustrated by LUT 1000, for example, there may be overlapping temperature values within different temperature subranges (e.g., temperature 40° C. is provided in both of the lower temperature subranges). If so, operation returns to block 1206 in which the parameters for the different temperature subrange are applied, and operation repeats for the current temperature within the new temperature subrange.

Otherwise, operation proceeds to block 1228 to inquire whether a different site should be tested for the current temperature. When there are multiple sites, each site may be tested at the current temperature. If so, operation returns to block 1204 to select a different site.

Otherwise, operation proceeds to block 1230 to determine whether additional temperatures need to be tested. If so, operation returns to block 1202 in which a new temperature is applied. Once the temperature 0° C. is tested, for example, the temperature may be increased to 4° C. and the entire process repeated for the new temperature until the corresponding one or more lookup tables are completed. Otherwise, operation is completed.

The calibration procedure illustrated by the flowchart of FIG. 12 is exemplary only and may be modified for different configurations. Also, the calibration procedure may be modified to determine more accurate DAC_REF values for temperature window ranges within each temperature subrange to potentially achieve greater accuracy.

Figure 13:
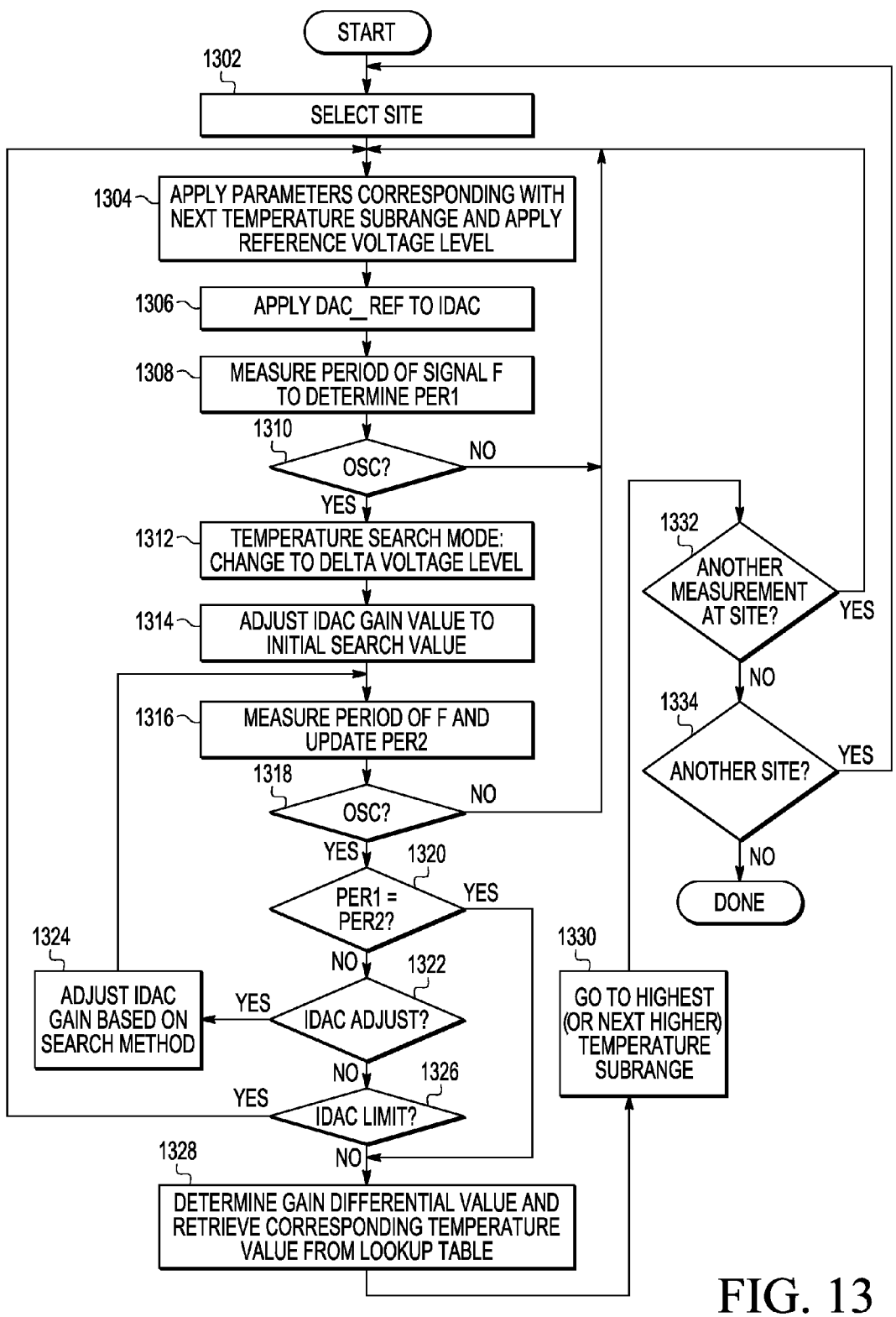
FIG. 13 is a flowchart diagram of a temperature measurement procedure according to one embodiment which may be performed by the system of FIG. 7 for measuring temperature.

FIG. 13 is a flowchart diagram of a temperature measurement procedure according to one embodiment which may be performed by the system 700 for measuring temperature. In this case the electronic system 100 is operating and it is desired to measure and monitor the temperature at one or more sites. The temperature measurement procedure is substantially similar to the calibration procedure except that the temperature is not controlled and is otherwise unknown. At first block 1302, a site is selected by assertion of the SSEL value in the event that multiple sites are provided. This step is omitted or bypassed when there is only one site. At next block 1304, the parameters that correspond with the "next" temperature subrange are applied. In the first iteration in order to avoid possible failure, the highest temperature subrange is presumed. As an example, for the temperature measurement select and control system 700, the temperature sensor device size, the effective device size, and the reference diode voltage are programmed for the highest temperature subrange. As shown in table 900, for example, the initial diode voltage is VD=VH1 (the reference voltage value for the highest temperature subrange) selected by VSEL, the initial device size is DH selected by RSEL, and the gain values MA1 and MB1 are selected and applied to the PMIR 710 and 712, respectively.

At next block 1306, an initial or default DAC_REF is selected as the gain value G and the IDAC 714 is programmed accordingly. The initial or default DAC_REF may be stored in the memory 728 or may be a predetermined default value or the like. Although one of the DAC_REF values from the table 900 may be used, the temperate is yet unknown in the first iteration so that one may be arbitrarily selected. When the final temperature value is determined, the corresponding DAC_REF value from the table 900 may be retrieved and the temperature measurement procedure repeated using the retrieved DAC_REF value to potentially obtain a more accurate temperature measurement.

At next block 1308, the period of the output frequency F of the VCO 716 is measured, which corresponds with a reference period PER1. As previously noted, however, it is possible that the VCO 716 is unable to oscillate in the event the driving current and voltage levels are too low, such as when the temperature is low and a high temperature subrange is assumed. In this case, operation proceeds to block 1310 to inquire as to whether the VCO 716 is oscillating. This determination may be made by determining whether the period corresponds with a high period value PER_HI in which the oscillation detector 722 has detected non-oscillation. If the VCO 716 is not oscillating, then operation returns to block 1304 in which the next lower temperature subrange is selected.

If there is oscillation as determined at block 1310, then operation proceeds to block 1312 to initiate the temperature search mode in which the diode voltage is changed to a different value, such as a delta (lower) VD diode voltage. As shown in table 900, for example, for the highest temperature subrange of 100-125° C., the diode voltage is changed to VD=VL1 (the delta voltage value for the highest temperature subrange) selected by VSEL. The change of diode voltage changes the diode current to a new level, which correspondingly changes the frequency of signal F at the output of the VCO 716.

At next block 1314, the gain value G is changed to an initial search value for the temperature search and programmed into the IDAC 714. At next block 1316, the period of the output frequency F of the VCO 716 is measured and the PER2 value is updated accordingly. At next block 1318, it is once again queried whether there is oscillation. Although oscillation was verified at block 1310, it may have been under marginal conditions and the parameters have changed. If there is no oscillation, operation returns to block 1304 to advance to the next lower temperature subrange. If there is oscillation, operation proceeds to block 1320 in which it is queried whether the reference and delta periods PER1 and PER2 are equal. If not, operation proceeds to block 1322 to determine whether additional gain adjustments are to be made to the IDAC 714, and if so, operation proceeds to block 1324 to adjust the gain of the IDAC 714. Operation then loops back to block 1316 to measure the period of F again to update PER2 to a new value.

In a similar manner as described above for the calibration procedure, operation loops between blocks 1316 and 1324 until PER2 and PER1 are equal or until it is determined that there are no further gain adjustments. As noted above, various methods may be used to implement gain adjustment and comparison, such as a binary or linear search or the like. The binary search method provides a quick and efficient means for converging on the gain value corresponding with the actual temperature. If PER1 and PER2 are not equal and no further adjustments of gain are available as determined at block 1322, then operation proceeds to block 1326 to inquire whether the IDAC 714 has reached one of its limits, such as its lowest limit value. If so, then the selected temperature subrange is too high and operation returns to block 1304 to advance to repeat the search within the next lower temperature subrange.

When PER2=PER1, or if there are no further gain adjustments and the IDAC 714 has not reached a limit value, then operation proceeds to block 1328 in which the gain differential value is determined and used to retrieve a corresponding temperature value from the corresponding lookup table, such as the LUT 1000. The gain differential value was determined as the difference between the final gain value and the DAC_REF value. The reference period PER1 was determined using DAC_REF as the gain with application of the reference voltage level applied to the selected diode, and the new period PER2 was determined using the final gain value of G with application of the delta voltage level applied to the thermal sense diode. Thus the gain differential value indicates the ratio of diode current resulting from application of the reference versus the delta voltage level. Alternatively, if the DAC_REF value is equivalent to a minimum gain value, then the final gain value may be used as the gain differential value.

It is noted that it is possible, maybe even likely, that the exact gain value is not directly listed in the lookup table. As shown in the LUT 1000, for example, the temperature values are separated by 4° C. increments so that the gain values are spread accordingly. The corresponding temperature may be determined by interpolation. First, the gain values in the lookup table above and below the measured gain value are determined and retrieved along with the corresponding temperature values. The measure gain value is interpolated between the retrieved gain values and a temperature is interpolated between the corresponding retrieved temperature values in a linear manner. For example weighting values may be applied to the retrieved temperature values to interpolate a final temperature value.

Operation then proceeds to block 1330 in which the subrange is advanced back to the highest (or next higher) temperature subrange for making a subsequent measurement at the same site or at a different site. Although the temperature may not have changed by a significant degree, one approach is to return back to the highest subrange for any subsequent measurement. In an alternative embodiment, rather than returning to the highest subrange, operation returns to the next higher subrange since the temperature is unlikely to change by a significant amount between successive measurements. With reference to LUT 1000, for example, if the temperature is determined as 42° C. within the third subrange 40-70° C., then the subrange may be changed to the next higher subrange 70-100° C. for a potentially faster temperature search.

Operation then proceeds to block 1332 in which it is queried whether to make another measurement at the current site selection. If so, operation returns to block 1304 in which the parameters for the selected temperature subrange (e.g., current, highest, or next higher) and operation continues for another measurement. If another measurement is not to be made at the current site, operation proceeds to block 1334 to inquire whether to make a measurement at a different site. If so, operation returns to block 1302 to select a different site. Otherwise, operation is completed.

The reference and delta voltages may be configured for particular process technologies and target temperature ranges among other factors and variables. Many types of process technologies are contemplated, such as, for a non-limiting list of examples, 90 nanometer (nm), 40 nm, 28 nm, 20 nm, 14 nm, etc. The thermal sensor sizes and applied bias voltages may be varied or otherwise adjusted based on the process technology and other circuit parameters. In one non-limiting specific embodiment using 28 nm technology, for example, a reference voltage of about 0.5V and a delta voltage of about 0.45V with a voltage difference of 0.05V, or 50 millivolts (mV) may be used for the highest temperature subrange of 100-125° C. In the same specific embodiment, the voltages are adjusted upwards to a reference voltage of about 0.8V and a delta voltage of about 0.75V with a voltage difference of 50 mV. The voltage difference may may be the same or may be adjusted for each temperature subrange. In general, the reference and delta temperatures may have any suitable voltage levels depending upon the particular process implementation. For existing process technologies, the voltage levels range from about 100 mV up to about 1V with a difference voltage ranging between a few mV (e.g., 20 mV) up to a few hundred mV (e.g., 200 mV).

Although the invention is described herein with reference to specific embodiments, various modifications and changes can be made without departing from the scope of the present invention as set forth in the claims below. In alternative configurations, for example, inverse source reference and/or circuitry may be implemented relative to the source voltages while achieving the same or similar results. For example, the thermal sensing diodes (e.g., DR, D1, D2, DN, etc.) are shown having cathodes referenced to a ground or COM but instead may have their anodes coupled to a source voltage, such as VDD or the like, in which the supporting circuitry is changed accordingly to achieve similar results. Similarly, The VCOs (e.g., 402, 502, 622, 716) are shown having an upper power node coupled to VDD, whereas alternative configurations are contemplated in which the lower power nodes are instead referenced to a ground or COM and the current mirror configuration develops a voltage on their corresponding upper power nodes to achieve similar results.

Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims. Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A thermal sensor system, comprising:
   at least one thermal sensor;
   a voltage control network which applies a reference voltage level and a corresponding delta voltage level to said at least one thermal sensor, wherein said at least one thermal sensor responsively develops a reference current signal and a corresponding delta current signal;
   a current gain network configured to adjust gain of said delta current signal relative to said reference current signal;
   a current compare sensor responsive to said reference current signal and said delta current signal which is configured to provide a comparison metric;
   a controller which is configured to select said reference voltage level and said delta voltage level from among a plurality of reference voltage levels and a corresponding plurality of delta voltage levels, wherein said selected reference and delta voltage levels correspond with a selected one of a plurality of temperature subranges; and
   wherein said controller is further configured to control said current gain network to adjust gain of said delta current signal while monitoring said comparison metric to determine a gain differential value indicative of a current ratio of said reference current signal and said delta current signal, and wherein said controller determines a temperature value based on said gain differential value.

2. The thermal sensor system of claim 1, wherein said controller is configured to search said plurality of temperature subranges from highest to lowest until a valid gain differential value is obtained.

3. The thermal sensor system of claim 1, wherein for at least one of said plurality of temperature subranges, said controller is configured to apply said selected reference voltage level to said at least one thermal sensor and to program said current gain network with an initial gain value to determine a reference comparison metric, and then to apply said delta voltage level to said at least one thermal sensor and then to adjust gain of said current gain network until said comparison metric substantially matches said reference comparison metric to provide a final gain value, and then to determine said gain differential value as a difference between said final gain value and said initial gain value.

4. The thermal sensor system of claim 1, wherein:
said current gain network comprises at least one mode gain block and at least one search gain block; and
wherein said controller is configured to program said at least one mode gain block based on said selected one of said plurality of temperature subranges and to further adjust gain of said at least one search gain block to determine said gain differential value.

5. The thermal sensor system of claim 1, further comprising:
said current compare sensor comprising a voltage controlled oscillator responsive to said reference current signal and said delta current signal for providing an oscillator signal as said comparison metric;
an oscillation detect circuit which senses whether said oscillator signal is oscillating and which provides a frequency sense signal indicative thereof; and
wherein said controller is configured to search said plurality of temperature subranges from highest to lowest until a valid gain differential value is obtained, and to advance to a next lower temperature subrange when said frequency sense signal indicates non-oscillation of said oscillator signal.

6. The thermal sensor system of claim 1, wherein:
said current compare sensor comprises a voltage controlled oscillator responsive to said reference current signal and said delta current signal for providing an oscillator signal as said comparison metric; and
wherein for at least one of said plurality of temperature subranges, said controller is configured to apply said selected reference voltage level to said at least one thermal sensor and to program said current gain network with an initial gain value to determine a reference period of said oscillator signal, and then to apply said delta voltage level to said at least one thermal sensor and then to adjust gain of said current gain network until an updated period of said oscillator signal substantially matches said reference period to provide a final gain value, and then to determine said gain differential value as a difference between said final gain value and said initial gain value.

7. The thermal sensor system of claim 1, further comprising:
a memory storing a plurality of temperature values including one temperature value for each of a plurality of gain values; and
wherein said controller is configured to use said gain differential value to retrieve a corresponding temperature value from said memory.

8. The thermal sensor system of claim 1, further comprising:
a memory storing a plurality of temperature values including one temperature value for each of a plurality of gain values;
said controller is configured to retrieve a pair of temperature values and a corresponding pair of gain values from said memory closest to said gain differential value; and
wherein said controller is configured to interpolate a measured temperature value from said at least one temperature value and said at least one corresponding gain value.

9. The thermal sensor system of claim 1, wherein:
said at least one thermal sensor comprises a plurality of different sized thermal sensors; and
wherein said controller is configured to select from among said plurality of different sized thermal sensors to select a thermal sensor which corresponds with said selected one of said plurality of temperature subranges.

10. The thermal sensor system of claim 9, wherein:
said current gain network comprises at least one mode gain block and at least one search gain block; and
wherein said controller is further configured to program said at least one mode gain block based on said selected one of said plurality of temperature subranges and to further adjust gain of said at least one search gain block to determine said gain differential value.

11. A thermal sensor system, comprising:
a plurality of different sized thermal sensors;
a controller which is configured to select from among said plurality of different sized thermal sensors to select a thermal sensor having a size which corresponds with a selected one of a plurality of temperature subranges;
a voltage control network which applies a reference voltage level and a corresponding delta voltage level to said selected thermal sensor, wherein said selected thermal sensor responsively develops a reference current signal and a corresponding delta current signal;
a current gain network configured to adjust gain of said delta current signal relative to said reference current signal;
a current compare sensor responsive to said reference current signal and said delta current signal which is configured to provide a comparison metric; and
wherein said controller is further configured to control said current gain network to adjust gain of said delta current signal while monitoring said comparison metric to determine a gain differential value indicative of a current ratio of said reference current signal and said delta current signal, and wherein said controller determines a temperature value based on said gain differential value.

* * * * *